(12) United States Patent
Lee et al.

(10) Patent No.: US 11,544,924 B1
(45) Date of Patent: Jan. 3, 2023

(54) INVESTIGATION SYSTEM FOR FINDING LOST OBJECTS

(71) Applicant: Alarm.com Incorporated, Tysons, VA (US)

(72) Inventors: Jangwon Lee, Tysons, VA (US); Aaron Lee Roberts, Centreville, VA (US); Bret Jutras, Sterling, VA (US); Allison Beach, Leesburg, VA (US); Donald Gerard Madden, Columbia, MD (US)

(73) Assignee: Alarm.com Incorporated, Tysons, VA (US)

( * ) Notice: Subject to any disclaimer, the term of this patent is extended or adjusted under 35 U.S.C. 154(b) by 451 days.

(21) Appl. No.: 16/842,900

(22) Filed: Apr. 8, 2020

Related U.S. Application Data

(60) Provisional application No. 62/830,962, filed on Apr. 8, 2019.

(51) Int. Cl.
| | |
|---|---|
| G06V 20/40 | (2022.01) |
| G06K 9/62 | (2022.01) |
| G08B 21/18 | (2006.01) |
| G08B 31/00 | (2006.01) |

(52) U.S. Cl.
CPC .......... *G06V 20/40* (2022.01); *G06K 9/6265* (2013.01); *G08B 21/182* (2013.01); *G08B 31/00* (2013.01); *G06V 20/44* (2022.01); *G06V 2201/10* (2022.01)

(58) Field of Classification Search
None
See application file for complete search history.

(56) References Cited

U.S. PATENT DOCUMENTS

| | | | |
|---|---|---|---|
| 8,908,034 B2 | 12/2014 | Bordonaro | |
| 9,443,414 B2 | 9/2016 | Scavezze et al. | |
| 9,674,664 B1* | 6/2017 | Laursen | G08G 1/164 |
| 10,902,263 B1* | 1/2021 | Angel | A61H 3/061 |
| 2011/0124326 A1* | 5/2011 | Kudo | G08B 25/08 |
| | | | 455/420 |
| 2012/0218103 A1* | 8/2012 | Alves | G08B 21/0266 |
| | | | 340/539.32 |
| 2014/0044305 A1* | 2/2014 | Scavezze | H04M 1/72409 |
| | | | 382/103 |
| 2019/0147393 A1* | 5/2019 | McCafferty | G06V 20/52 |
| | | | 340/572.1 |

FOREIGN PATENT DOCUMENTS

| | | | | |
|---|---|---|---|---|
| CN | 107851351 B | * | 10/2020 | ......... H04L 12/2809 |
| DE | 102017111994 B3 | * | 10/2018 | |
| WO | WO-2011106529 A2 | * | 9/2011 | ......... G06Q 30/0226 |
| WO | WO-2016176223 A1 | * | 11/2016 | ....... G06F 17/30241 |

* cited by examiner

*Primary Examiner* — Mohammed Rachedine
(74) *Attorney, Agent, or Firm* — Fish & Richardson P.C.

(57) ABSTRACT

Methods, systems, and apparatus, including computer programs encoded on a computer storage medium, for finding lost objects. In some implementations, a request for a location of an item is obtained. Current video data from one or more cameras is obtained. It is determined that the item is not shown in the current video data. Sensor data corresponding to historical video data is obtained. Events that likely occurred with the item and corresponding likelihoods for each of the events are determined. A likely location for the item is determined based on the likelihoods determined for the events. An indication of the likely location of the item is provided.

20 Claims, 7 Drawing Sheets

500 

```
┌─────────────────────────────────────────────────────────────┐
│ DETERMINE ONE OR MORE ADDITIONAL LIKELY LOCATIONS           │
│ OF THE ITEM BASED ON THE LIKELIHOODS DETERMINED             │
│                 FOR THE EVENTS                              │
│                                                         502 │
└─────────────────────────────────────────────────────────────┘
                              │
                              ▼
┌─────────────────────────────────────────────────────────────┐
│     PROVIDE ONE OR MORE INDICATIONS OF EACH OF THE          │
│    ONE OR MORE ADDITIONAL LIKELY LOCATIONS OF THE           │
│                         ITEM                                │
│                                                         504 │
└─────────────────────────────────────────────────────────────┘
```

FIG. 5

INVESTIGATION SYSTEM FOR FINDING LOST OBJECTS

CROSS-REFERENCE TO RELATED APPLICATION

This application claims the benefit of U.S. Provisional Application No. 62/830,962, filed Apr. 8, 2019, and titled "Investigation System for Finding Lost Objects," which is incorporated by reference.

BACKGROUND

People commonly lose or misplace their items and spend significant time attempting to track down those items with varying success.

SUMMARY

In some implementations, a security monitoring system uses data from one or more sensors to locate and/or track various items in a house or other building. The system can be a security monitoring system. The one or more sensors may be part of the security monitoring system and can include, for example, cameras.

In some implementations, an occupant is able to communicate with the system through a system interface (e.g., a touchscreen), a device that is able to communicate with the system. For example, the system interface may be a smartphone that runs an app for the security monitoring system) and/or a microphone that is in communication with the system. An occupant may communicate to the system a name or description of an item that the occupant is attempting to locate. The occupant may also communicate additional information, such as a time when they last saw the item or a location where they last saw the item. The system may request this additional information or other information from the occupant.

The system may use both live data (e.g., a live video feed from one or more cameras) and historical data (e.g., stored video feeds from one or more cameras) to determine a current location of the item or one or more potential locations of the item. The system may build a hypothesis graph which estimates the likelihood of the item being in each of the one or more potential locations. The system may provide these one or more potential locations to the occupant along with, in some implementations, a likelihood of the item being in each of the one or more potential locations.

The system may also provide the occupant, through a graphical user interface (GUI), a depiction of the hypothesis graph, which the occupant, in some implementations, may correct, modify, or verify aspects of. The hypothesis graph may include all events or potential events leading up to the item reaching the one or more potential locations. The hypothesis graph may include a likelihood of occurrence for each of the events or potential events. In addition to the hypothesis graph or in place of it, the system may provide the occupant a series of panels for each of the one or more potential locations. Each of these series of panels may include a panel for every event (or significant event) or predicted event leading up to the item reaching a potential location. Each of these events or potential events may be associated with a likelihood of occurrence.

In one general aspect, a method includes: obtaining a request for a location of an item; obtaining current video data from one or more cameras; determining that the item is not shown in the current video data; obtaining sensor data corresponding to historical video data; determining events that likely occurred with the item and corresponding likelihoods for each of the events; determining a likely location for the item based on the likelihoods determined for the events; and providing an indication of the likely location of the item.

Implementations may include one or more of the following features. For example, in some implementations, the method includes: determining one or more additional likely locations for the item based on the likelihoods determined for the events; and providing one or more indications of each of the one or more additional likely locations of the item.

In some implementations, determining a likely location for the item and determining one or more additional likely locations includes: obtaining a location count threshold; based on the determined events that likely occurred, determining possible locations for the item; and based on the likelihoods determined for the events, selecting from the possible locations the most likely locations, where a number of locations selected is equal to or less than the location count threshold.

In some implementations, determining a likely location includes: obtaining a location likelihood threshold; based on the determined events that likely occurred, determining one or more possible locations for the item; based on the likelihoods determined for the events, assigning a likelihood for each of the one or more possible locations; comparing the likelihoods for each of the one or more possible locations with the location likelihood threshold; and selecting a possible location with an assigned likelihood greater than or equal to the location likelihood threshold.

In some implementations, the sensor data includes stored video data.

In some implementations, the sensor data includes metadata extracted from the historical video data.

In some implementations, obtaining the sensor data includes: obtaining a time-period; and accessing historical video data that was created within the obtained time-period.

In some implementations, determining that the item is not shown in the current video data includes: obtaining an appearance model of the item; identifying objects within the current video data; and comparing the identified objects with the appearance model of the item.

In some implementations, determining that the item is not shown in the current video data includes: obtaining a confidence threshold; analyzing the current video data; based on the analysis, determining a confidence of whether the item is in the current video data; and determining that the confidence is below the confidence threshold.

In some implementations, determining a confidence includes providing the analyzed video data to an inference model leveraging a machine-learning network.

In some implementations, determining events that likely occurred with the item and corresponding likelihoods for each of the events includes: extracting data points from the obtained sensor data; based on the extracted data points, identifying at least one of the item, an owner of the item, a person other than the owner, an action of the owner, or an action of a person other than the owner; and determining a likelihood that the one or more identifications are correct.

In some implementations, determining events that likely occurred with the item and corresponding likelihoods for each of the events includes: extracting data points from the obtained sensor data; based on the extracted data points, identifying a pattern associated with the item; based on the identified pattern, determining events that likely occurred with the item; and based on the identified patterned, determining likelihoods for each of the determined events.

In some implementations, determining events that likely occurred with the item and corresponding likelihoods for each of the events includes: obtaining a likelihood threshold; extracting data points from the obtained sensor data; based on the extracted data points, determining one or more possible events that may have occurred with the item; determining a likelihood for each of the one or more possible events; comparing the one or more likelihoods for each of the one or more possible events with the likelihood threshold; and selecting one or more events of the one or more possible events that have a likelihood at or above the likelihood threshold.

In some implementations, determining a likelihood includes providing the extracted data points to an inference model leveraging a machine-learning network.

In some implementations, providing an indication of the likely location of the item includes at least one of providing a textual description of the likely location, an image of the likely location, a clip of the likely location, or a floor plan having the likely location marked thereon.

In some implementations, the method includes: receiving input to correct an event of the events that likely occurred with the item; determining a new likelihood for each of the previously determined events; and providing a new indication of the likely location of the item.

In some implementations, receiving input to correct an event includes: receiving an indication of a selection of the event; and receiving an instruction to either verify the event or deny the event.

In some implementations, determining a new likelihood for each of the previously determined events includes increasing the likelihood of the event if the instruction is to verify the event or decreasing the likelihood of the event if the instruction is to deny the event.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 5 is a flowchart of an example process for determining multiple likely locations of an item.

Like reference numbers and designations in the various drawings indicate like elements.

DETAILED DESCRIPTION

Many residents equip their homes with security monitoring systems that include one or more sensors and controls for monitoring the resident's property. For example, the monitoring system can include cameras that capture activity within a room or at an access point (e.g., at a door), motion detectors that sense movement within an area of the property, door and window sensors (e.g., to detect whether a door or window is open and/or broken), sensors on utilities (e.g., to detect water usage), or environmental controls (e.g., thermostat settings). In some cases, the monitoring system can include controlled-access entry points that require user-authentication for passage, for example, a door equipped with a keypad requiring a user-specific code for entry. Such monitoring systems are not limited to homes and can be installed in a variety of properties, including commercial buildings as well as other residential buildings (e.g., apartments, condos, etc.).

Occupants of a house, apartment, an office, or other commercial or residential building commonly lose or misplace their items and spend significant time attempting to track down those items with varying success. The disclosed system can track an occupant's items using one or more sensors of an existing security monitoring system. Therefore, this disclosed system provides the benefit of not requiring a user to install additional sensors in the building (though additional sensors may be helpful and can provide increased tracking accuracy). In addition, this disclosed system provides the benefit of quickly identifying one or more potential locations where the item may be found. As such, the disclosed system can reduce the time it takes for the user to find an item and improve the chances of finding an item.

The disclosed system also provides the benefit of improving tracking over time through, for example, an occupant's feedback, corrections, or modifications to determinations made by the system or through an occupant's responses to the system's queries. Using this information, the disclosed system can improve its tracking, by for example, leveraging a machine learning network. This can be used to improve, for example, an appearance model of an item, an appearance model of an occupant, predictive algorithm(s), and/or an understanding of an occupant's behavior (e.g., determining patterns in an occupant's behavior with respect to one or more items).

Figure 1:
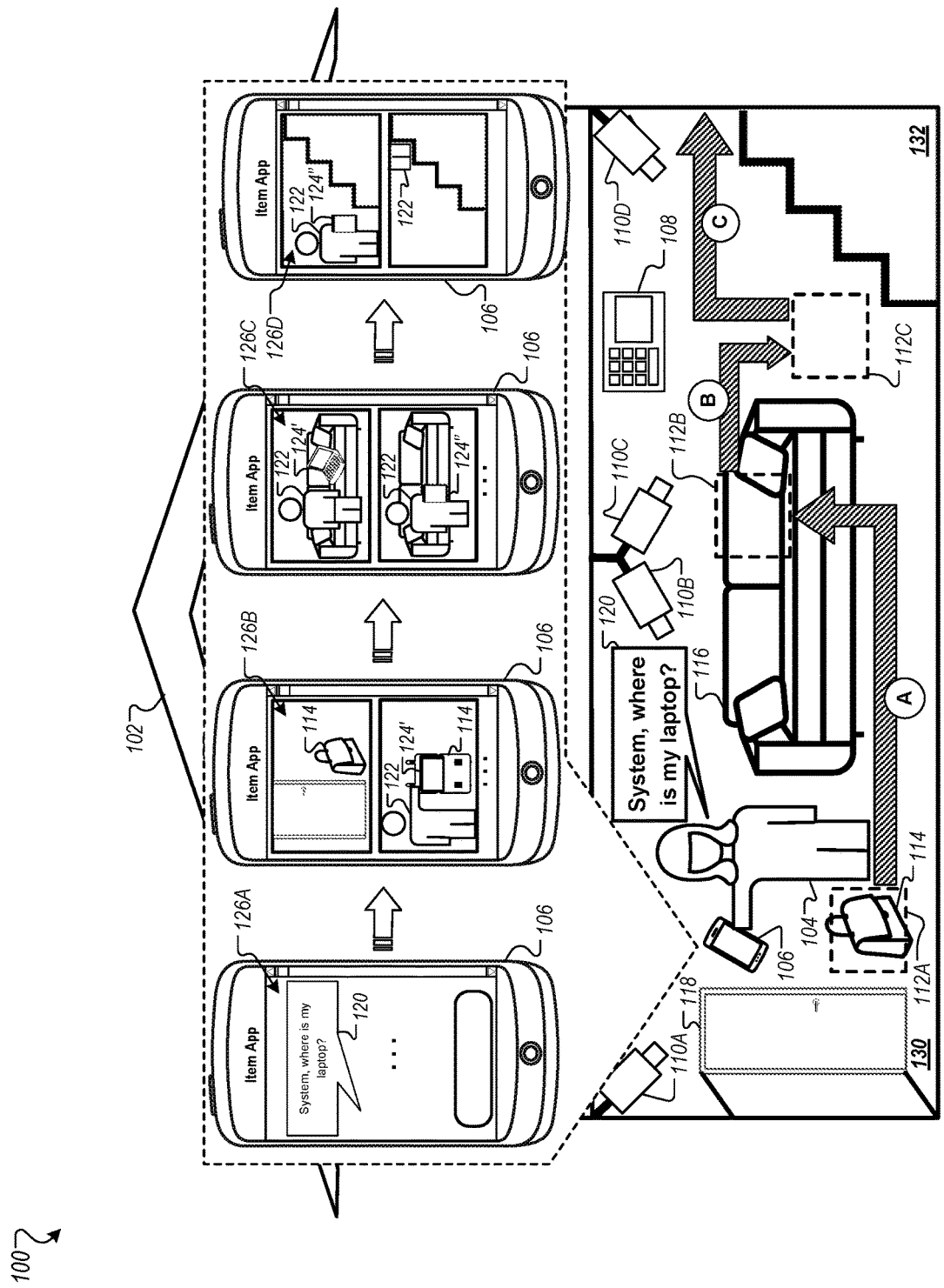
FIG. 1 is a diagram that illustrates an example system for finding lost or misplaced items.
Figure 6:
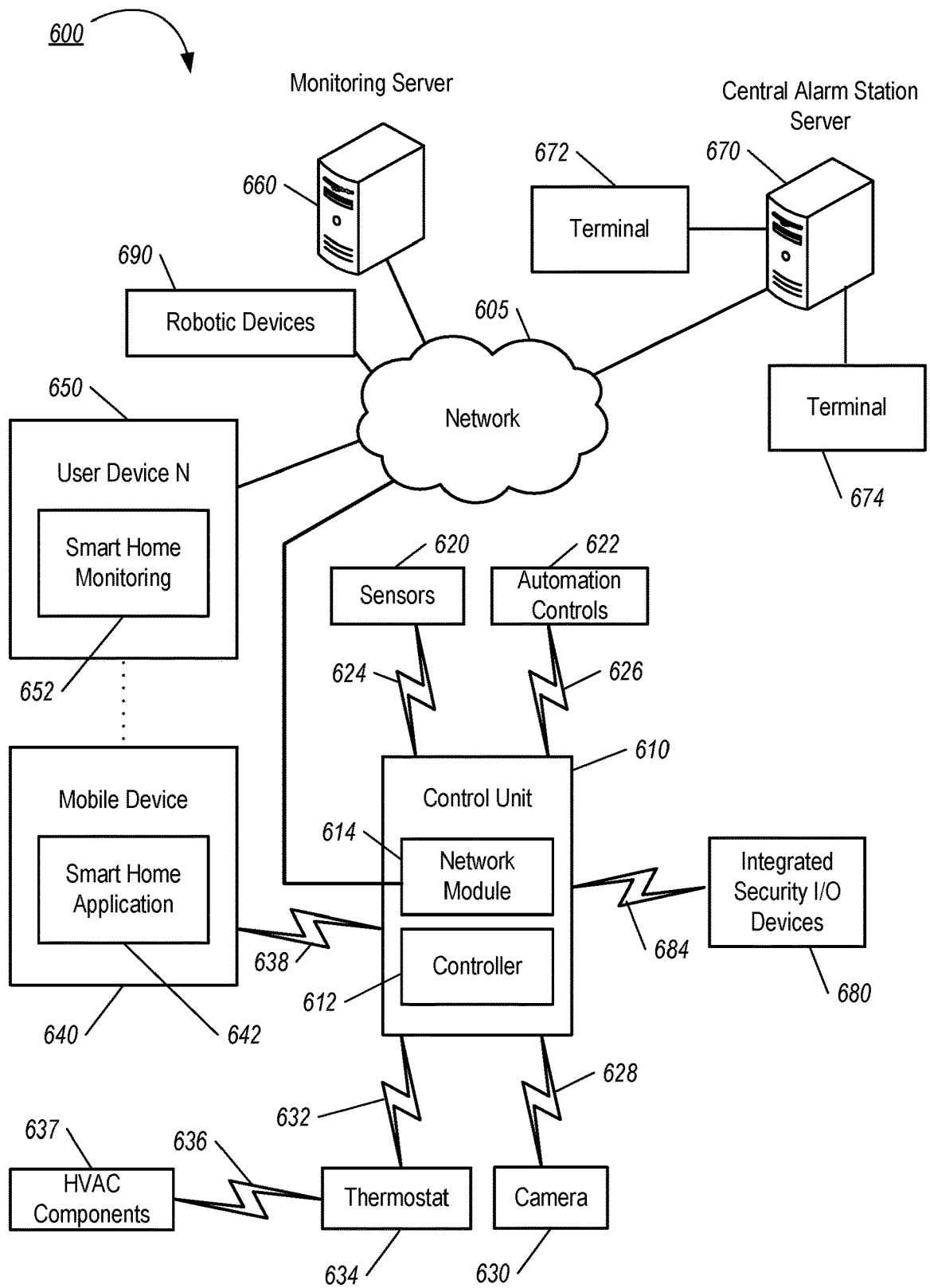
FIG. 6 is a block diagram illustrating an example security monitoring system.

FIG. 1 is a diagram that illustrates a system 100 that includes a security monitoring system 108 for finding lost or misplaced items, a house 102 in which the security monitoring system 108 is installed, a network (e.g., network 605 as shown in FIG. 6), and a first occupant 104 having a mobile computing device 106.

The security monitoring system 108 as shown includes an interface panel which an occupant (e.g., first occupant 104) can interact with through a microphone, a screen or touchscreen, and/or buttons or keys. The security monitoring system 108 can include one or more computing devices.

The security monitoring system 108 can also include sensors, such as cameras 110A-110D. The cameras 110A-110D can be visible-light cameras, infrared-light cameras (IR cameras), or a combination thereof. In some implementations, security monitoring system 108 includes other sensors, such as, for example, magnetic door or window sensors, sensors that can detect a Wi-Fi device, sensors that can detect a Bluetooth device, Bluetooth tracker(s) secured to one or more items, global positioning system (GPS) unit(s) secured to one or more items, an energy use sensor for one or more items (e.g., a smart plug that can detect the power being drawn by an item, such as a television), etc.

The security monitoring system 108 can communicate with one or more of the various sensors, including cameras 110A-110D, through a wired connection. In some implementations, the security monitoring system 108 can communicate with the various sensors, including cameras 110A-

110D, through the network. The network can be a wireless network, such as a cellular network or a Wi-Fi network.

The security monitoring system 108 can store sensor data (e.g., video feeds from cameras). When the security monitoring system 108 receives a command or query (e.g., query 120) to locate a lost or missing item (e.g., laptop 124), the security monitoring system 108 can access and analyze current sensor data (e.g., a live video feed from cameras 110A-110D) as well as access and analyze stored sensor data (e.g., stored video feed from cameras 110A-110D).

The security monitoring system 108 can automatically track the location(s)/potential location(s) of one or more items (e.g., laptop 124). For example, the security monitoring system 108 can start tracking before receiving a command or query from an occupant to locate a particular item. The security monitoring system 108 can store all or some of these tracked location(s) or potential location(s). In some implementations, the security monitoring system 108 stores the tracked location(s) or potential location(s) of an item for a particular length of time.

The security monitoring system 108 can store all tracked location(s) or potential location(s) of an item until a location of an item is verified, the system 100 (e.g., the security monitoring system 108) determines that there is a 100% likelihood that an item is at a particular location, or the system 100 (e.g., the security monitoring system 108) determines that a likelihood that an item is at a particular location is above a preset percentage (e.g., above 95%, 90%, or some other amount). In these scenarios, the security monitoring system 108 can choose to delete any stored previous locations or potential locations of the item.

The security monitoring system 108 can create and store, or access appearance models for various items. The security monitoring system 108 can create a model for an item by analyzing video feeds containing the item, by analyzing description of the item provided by an occupant, and/or accessing images of the item, the model of item, and/or the type of item stored online or on an occupant's device. The security monitoring system 108 can also access an existing appearance model for the item. The existing appearance model can be for the specific model of the item, or can be a generic model for that type of item. The security monitoring system 108 can additionally update or modify existing models of items in a similar fashion.

In updating an item's appearance model, the security monitoring system 108 can leverage a machine learning network to improve the model. For example, if an occupant indicates that an identified item is not what the security monitoring system 108 has identified it as, the error can be provided to a machine learning network, which can adjust the model in an effort to increase its accuracy. In this example, the security monitoring system 108 might also ask the occupant to label the item that it misidentified. With this label and the video feed data, the security monitoring system 108 can also update or create a model for the misidentified item, and learn how to differentiate the two items.

The security monitoring system 108 can create and store, or access appearance models for one or more occupants. The security monitoring system 108 can create a model for an occupant by analyzing video feeds containing the occupant, and/or accessing images of the occupant stored online or on an occupant's device. The security monitoring system 108 can also access an existing appearance model for the occupant. The security monitoring system 108 can also update or modify existing models of occupants in a similar fashion.

In updating an occupant's appearance model, the security monitoring system 108 can leverage a machine learning network to improve the model. For example, if the security monitoring system 108 receives feedback which indicates that an identified occupant is actually a different occupant, the error can be provided to a machine learning network, which will adjust the model in an effort to increase its accuracy. In this example, the security monitoring system 108 might also ask for a correct name of the misidentified occupant. With this name and the video feed data, the security monitoring system 108 can also update or create a model for the misidentified occupant, and learn how to differentiate the two occupants.

The security monitoring system 108 can learn and identify various actions performed by one or more occupants. The security monitoring system 108 can leverage a machine learning network, such as, for example, a deep neural network, to learn and later identify these actions. The security monitoring system 108 can use pose recognition (e.g., by analyzing video feeds from cameras 110A-110D) to determine a pose of an occupant. The security monitoring system 108 can associate a particular pose of an occupant with a particular action relating to an item.

The association of a particular pose with a particular action related to an item can be assigned an initial likelihood (e.g., a likelihood that the action related to an item is occurring given the recognized pose) that can be modified over time (e.g., as the machine learning network is improved or receives more data points). For example, if, through pose recognition, the security monitoring system 108 determines that the occupant is hunched over, the security monitoring system 108 can associate this pose with the action of using a laptop and can identify a likelihood that the occupant is currently performing the action of using the laptop. By using pose recognition, the security monitoring system 108 can track an item even when the item is out of sight of cameras (e.g., cameras 110A-110D,) or other sensors, or is too small to accurately track (e.g., a ring).

Similarly, the security monitoring system 108 can use atomic action recognition (e.g., by analyzing video feeds from cameras 110A-110D) to determine an atomic action being performed by an occupant. An atomic action can include various body movements of an occupant, including, for example, arm movements, hand movements, finger movements, etc. The security monitoring system 108 can associate a particular atomic action with an action related to an item. The association of a particular atomic action with a particular action relating to an item can be assigned an initial likelihood (e.g., a likelihood that the action related to the item is occurring given the recognized atomic action) that can be modified over time (e.g., as the machine learning network is improved or receives more data points).

For example, if, through atomic action recognition, the security monitoring system 108 determines that the occupant is performing a recognized hand movement, the security monitoring system 108 can associate this atomic action with the action of the occupant taking off a ring and can identify a likelihood that the occupant is currently performing the action of taking off the ring. In this example, through atomic action recognition, the security monitoring system 108 can determine that the occupant soon after performs a different hand movement and associates this atomic action with the action of the occupant placing an item down.

Again, the security monitoring system 108 can identify a likelihood that the occupant is currently performing the action of placing an item down. In this example, based on the two atomic actions and due to the close proximity in time of the two atomic actions, and possibly due to other factors (e.g., the item being placed down was too small to identify thorough image recognition), the security monitoring system 108 can determine that the item being placed down was the ring. By using atomic action recognition, the security monitoring system 108 can be able to track an item even when the item is out of sight of cameras (e.g., cameras 110A-110D,) or other sensors, or is too small to accurately track (e.g., a ring).

FIG. 1 also illustrates a flow of events, shown as stages (A) to (C), with each representing a step in an example process. Specifically, stages (A) to (C) illustrate an example process of the security monitoring system 108 tracking a laptop 124. Stages (A) to (C) may occur in the illustrated sequence, or in a sequence that is different from the illustrated sequence. For example, some of the stages may occur concurrently.

In some implementations, the security monitoring system 108's tracking of laptop 124 as shown in stages (A) to (C) can be initiated by the first occupant 104 asking the security monitoring system 108 a query 120 through, for example, the device 106. The first occupant 104 can submit query 120 verbally such that the query 120 is detected by a microphone of device 106 (or, in some implementations, by a microphone of the security monitoring system 108). Alternatively, first occupant 104 can submit the query 120 textually through a touchscreen or a keypad of the device 106 (or, in some implementations, through a touchscreen or a keypad of the security monitoring system 108) or through a keyboard connected to device 106. Here, the query 120 is provided verbally by the first occupant 104 through a microphone of device 106. Device 106 performs speech to text conversion on the query 120 in its verbal format to a text format. The device 106 wirelessly submits query 120 to the security monitoring system 108 through, for example, a mobile application on device 106. Here, the query identifies that the first occupant 104 is searching for her laptop. In these implementations, the security monitoring system 108 can analyze stored sensor data, such as stored video feed from cameras 110A-110D, in order to determine tracking information of laptop 124. This tracking information can include one or more locations/potential locations and events related to laptop 124, such as a current location or one or more potential current locations.

In some implementations, the security monitoring system 108 has already tracked laptop 124 and performed that steps of stages (A) to (C). The security monitoring system 108 can start tracking items, such as laptop 124, automatically without the need for a command or query from an occupant (e.g., first occupant 104). When the first occupant 104 submits query 120, the security monitoring system 108 accesses the already determined tracking information of laptop 124. Tracking can be automatically initiated when the security monitoring system 108 identifies bag 114 as a possible container of laptop. Tracking can be initiated by the security monitoring system 108 identifying laptop 124 or identifying an item that has a high likelihood of being laptop 124 (e.g., based on the item having a similar shape, similar size, and/or similar color to an appearance model for laptop 124).

At stage (A), the security monitoring system 108 identifies a first location 112A for laptop 124. In identifying first location 112A, the security monitoring system 108 can use stored and/or accessed video feed from cameras 110A and/or 110B. The first location 112A may be initially identified as a potential location of laptop 124.

The security monitoring system 108 may identify location 112A as a potential location after determining that bag 114 by the door 118 might contain laptop 124. The security monitoring system 108 can determine that bag 114 possibly contains laptop 124 due to the size of bag 114 being large enough to hold laptop 124, due to the laptop 124 having been previously placed within bag 114 or taken out of bag 114, and/or due to the bag 114 being near the last known location of laptop 124.

The security monitoring system 108 can determine that the bag 114 is large enough to store the laptop 124 by comparing the size of the bag 114 (as determined, for example, by analyzing data from cameras 110A and/or 110B) with an appearance model of laptop 124 (either stored or otherwise accessible by the security monitoring system 108), a generic appearance model of a laptop (if, for example, an appearance model of laptop 124 does not exist or is not available), known dimensions of laptop 124 (either stored or otherwise accessible by the security monitoring system 108), or generic dimensions of a laptop (if, for example, dimensions of laptop 124 are not known or not available).

At stage (A), the security monitoring system 108 can assign a likelihood that the laptop 124 is within bag 114. In some implementations, the security monitoring system 108 will only identify first location 112A as a possible location of laptop 124 if the likelihood that the laptop is in that location is above a threshold percentage (e.g., greater than a 40%). In some implementations, the security monitoring system 108 will identify first location 112A as a possible location of laptop 124 if the likelihood that the laptop is in that location is above 0%. In some implementations, the security monitoring system 108 will identify first location 112A as a possible location of laptop 124 if the likelihood that the laptop is in that location is high enough so as to put first location 112A within a set number of the most likely locations where laptop 124 may be located (e.g., first location 112A falls within the top five most likely locations of laptop 124).

At stage (A), an event occurs when a second occupant 122 removes an item 124' from the bag 114. The security monitoring system 108 can identify the event and can determine that the item 124' taken out of the bag 114 might be laptop 124. The security monitoring system 108 can identify the event through analysis of video feeds from cameras 110A and/or 110B. Here, the security monitoring system 108 can compare the item 124' taken out of bag 114 with an appearance model of laptop 124. Based on the comparison, the security monitoring system 108 can determine a likelihood that the item 124' is laptop 124. In some implementations, where a likelihood exists that the laptop 124 remains in the bag, the security monitoring system 108 continues to monitor the bag 114 and tracks the item 124' (which may be laptop 124).

In some implementations, the security monitoring system 108 does not compare the item 124' taken out of the bag 114 with an appearance model of laptop 124 because, for example, the item 124' may not be visible to cameras 110A and 110B. In these implementations, the security monitoring system 108 can determine that an item 124' (which may be laptop 124) was taken out of the bag 114 due to actions performed by the second occupant 122 (e.g., picking up the bag 114, opening the bag 114, moving the bag 114, etc.).

When such an event occurs (e.g., second occupant 122 taking item 124' out of bag 114), the security monitoring system 108 can, based on the event and associated comparison by the security monitoring system 108, confirm that location 112A was an actual location of laptop 124 (e.g., likelihood is 100%), can update a likelihood percentage of location 112A being an actual location of laptop 124, or can determine that location 112A was not an actual location of laptop 124 (e.g., likelihood is 0%). Here, based on the event and associated comparison (e.g., based on the second occupant pulling out an item 124' that appears similar to an appearance model of laptop 124), the likelihood percentage of location 112A being an actual location of laptop 124 is increased.

At stage (A), the security monitoring system 108 continues to track the item 124' taken out of the bag 114 to couch 116, where the second occupant 122 has brought the item 124'.

At stage (B), the security monitoring system 108 identifies a second location 112B for laptop 124. In identifying second location 112B, the security monitoring system 108 can use stored and/or accessed video feed from cameras 110C and/or 110D. Second location 112B can be initially identified as a potential location of laptop 124.

The security monitoring system 108 can identify location 112B initially as a potential location based on the determined likelihood that the item 124' taken out of the bag 114 in stage (A) was laptop 124.

At stage (B), the security monitoring system 108 analyzes the video feed from cameras 110C and/or 110D. Here, the security monitoring system 108 can compare the item 124' (now on couch 116 at location 112B) with an appearance model of laptop 124 for a second time. Due to, for example, the cameras 110C and/or 110D having a better viewing angle of the item (e.g., having a perspective view versus a side view), having a different viewing angle of the item than cameras 110A and/or 110B, and/or being closer to the item (and, thus, having a higher resolution image of the item), the security monitoring system 108 determines an increased likelihood of the item 124' being laptop 124 (or, in some implementations, confirms that the item 124' at location 112B is laptop 124).

Based on the change in likelihood that the item 124' is laptop 124, the security monitoring system 108 can update a likelihood percentage of location 112A being an actual location of laptop 124, and/or update a likelihood percentage that the item 124' that the second occupant 122 took out of the bag 114 was laptop 124. Here, based on the change in likelihood that the item 124' at location 112B is laptop 124 is an increase in likelihood, the likelihood percentage of location 112A being an actual location of laptop 124 is increased and the likelihood percentage of the item 124' taken out of the bag 114 being the laptop 124 is increased.

At stage (B), an event occurs where the second occupant 122 moves from the couch. The security monitoring system 108 can identify the event and can determine whether or not the second occupant 122 moved from the couch 116 with an item 124" that might be the laptop 124 through analysis of video feeds from cameras 110C and/or 110D. Here, the security monitoring system 108 can identify that the second occupant 122 is moving from the couch 116 with an item 124". The security monitoring system 108 can assign a likelihood that the item 124" is the laptop 124 based on a comparison of the item 124" with an appearance model of laptop 124, and/or based on a likelihood that the item 124" is item 124' that was taken out of bag 114 in stage (A) (e.g., by looking at whether the item 124' taken out of bag 114 is still at location 112B or if it has moved). Here, based on the comparison and/or determination, the security monitoring system 108 can determine a likelihood that item 124" is the laptop 124. In some implementations, where a likelihood exists that the laptop 124 remains in the bag, the security monitoring system 108 continues to monitor the bag 114. In some implementations, where a likelihood exists that the item 124" is not item 124', the security monitoring system 108 continues to monitor the area where item 124' was last seen (e.g., near couch 116).

When such an event occurs (e.g., second occupant 122 moves with an item 124" that may be laptop 124), the security monitoring system 108 can, based on the event, update likelihoods of previously identified events associated with laptop 124 (e.g., likelihood that the item removed from bag 114 was laptop 124) and/or previously identified locations associated with laptop 124 (e.g., location 112A, and/or location 112B).

At stage (B), the security monitoring system 108 continues to track the item with the second occupant 122 as the second occupant moves towards the stairs 132.

At stage (C), the security monitoring system 108 identifies a third location 112C for laptop 124. In identifying third location 112C, the security monitoring system 108 can use stored and/or accessed video feed from cameras 110C and/or 110D. Third location 112C may be initially identified as a potential location of laptop 124.

The security monitoring system 108 can identify location 112C initially as a potential location based on the determined likelihood that the item 124" taken by the second occupant 122 from couch 116 in stage (B) was laptop 124.

At stage (C), the security monitoring system 108 analyzes the video feed from cameras 110C and/or 110D. In some implementations, the security monitoring system 108 compares the item 124" (now at location 112C) with an appearance model of laptop 124 for a second time. In these implementations, due to, for example, the cameras 110C and/or 110D having a better viewing angle of the item, having a different viewing angle of the item than cameras 110C and/or 110D previously had, and/or being closer to the item (and, thus, having a higher resolution image of the item), the security monitoring system 108 can determine an increased or lowered likelihood that item 124" is laptop 124. In these implementations, any change in likelihood is used to modify the likelihood of previous events or locations associated with laptop 124.

At stage (C), an event occurs where the second occupant 122 leaves the room 130 by walking up the stairs 132 (to an area that might not have any cameras or other sensors). The security monitoring system 108 can identify the event using the video feed from cameras 110C and/or 110D. The security monitoring system 108 can also determine that, other than moving out of the room 130 by going upstairs, the second occupant 122 took no further actions. That is, the security monitoring system 108 can determine that the second occupant 122 still had item 124" when he moved out of the room 130 (e.g., with a 100% likelihood). Because there is no change to the likelihood that item 124" is laptop 124, the likelihoods of the previous events and/or locations associated with laptop 124 may be left unchanged.

The potential locations (e.g., location 112A, location 112B, and location 112C) and events (e.g., item being removed from bag 114, item being moved from couch 116 with second occupant 122, and second occupant 122 leaving the room 130 with the moved item) associated with laptop 124 are made part of the tracking information for laptop 124. When first occupant 104 submits query 120 to the security monitoring system 108, the security monitoring system 108 can provide the first occupant 104 with the tracking information of laptop 124.

As shown, this tracking information is presented on an interface 126 of device 106. Interface 126A shows the submission of query 120 to the security monitoring system 108 through device 106. Interface 126B depicts the tracking information of stage (A). This includes an image of bag 114 which may contain laptop 124. Interface 126B also includes an image of the second occupant 122 removing an item 124' out bag 114. Interface 126C depicts the tracking information of stage (B). This includes an image of the second occupant 122 on the couch 116 with the item 124'. Interface 126C also includes an image of the second occupant 122 moving from the couch 116 with an item 124". Interface 126D depicts the tracking information of stage (C). This includes an image of the second occupant 122 standing by the stairs 132 with item 124". Interface 126D also includes an image of the second occupant 122 walking up the stairs 132 and out of room 130.

In some implementations, the first occupant 104 can scroll through interface 126 of device 106 in order to see the tracking information for laptop 124. Here, the tracking information for laptop 124 indicates the laptop 124 may be upstairs with the second occupant 122.

Figure 2A:
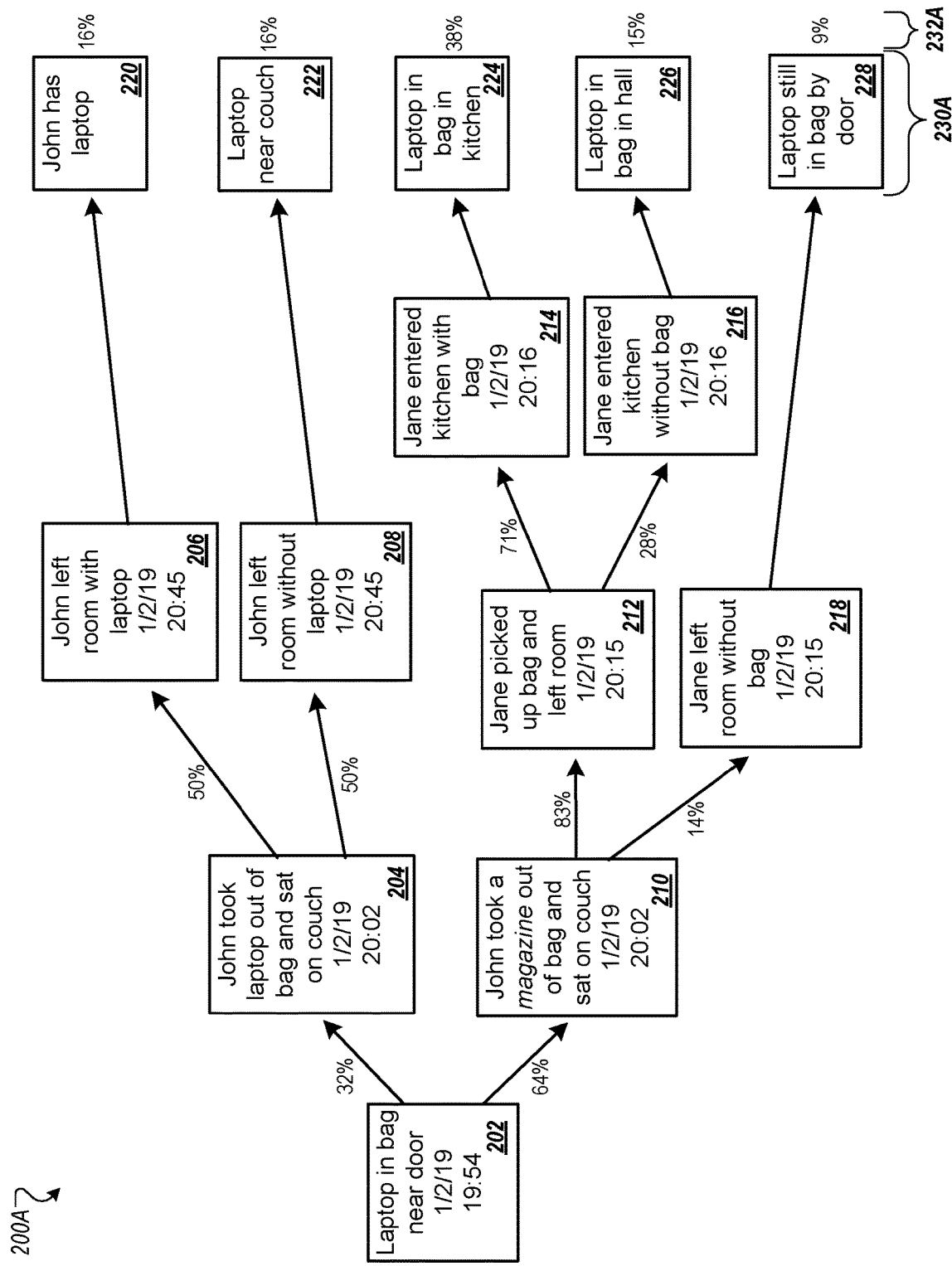
FIGS. 2A through 2B are diagrams that illustrate an example hypothesis graph.
Figure 2B:
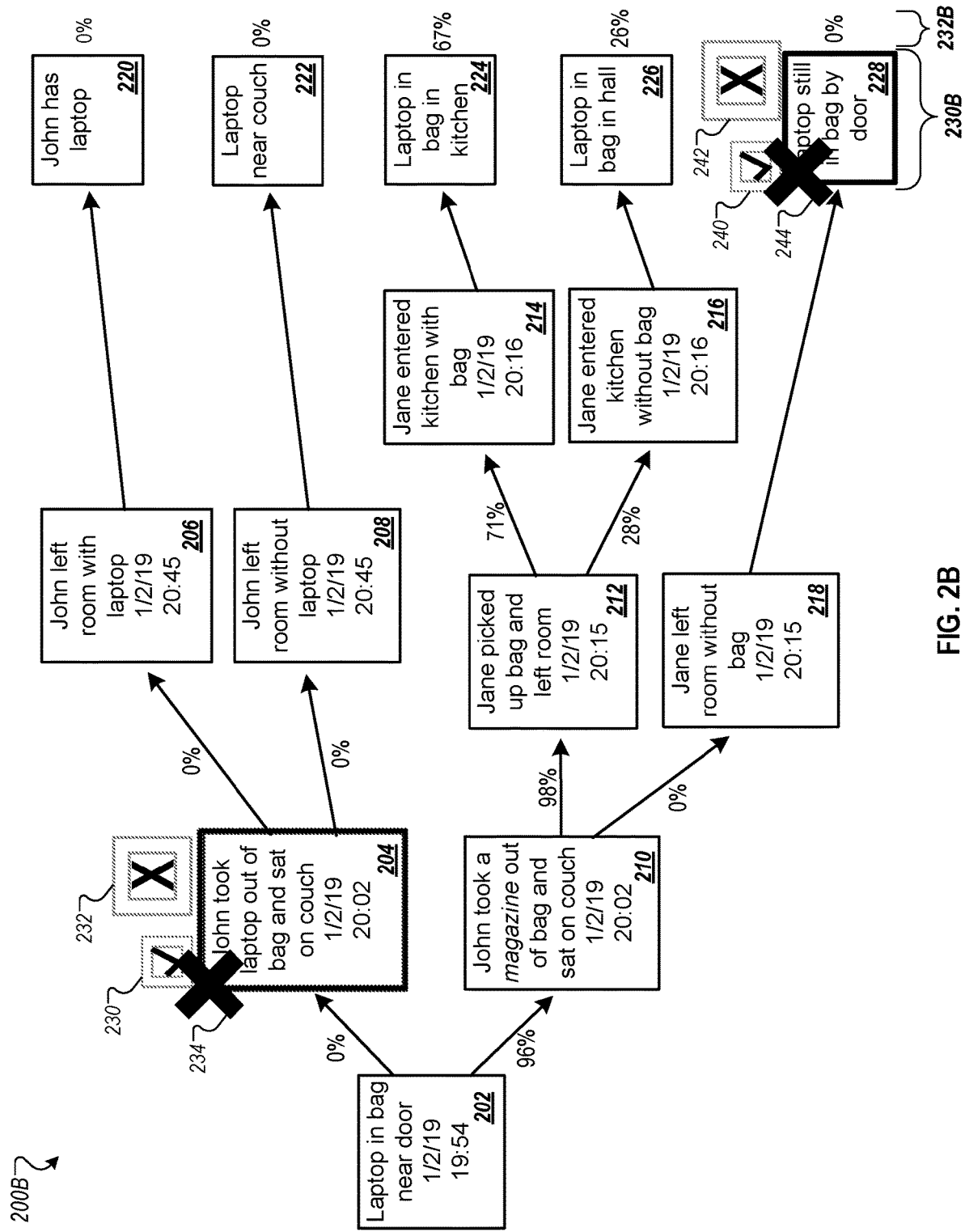

FIGS. 2A through 2B are diagrams that illustrate an example hypothesis graph 200. The hypothesis graph 200 can be created by the security monitoring system 108 as discussed above with reference to FIG. 1.

FIG. 2A is a diagram that illustrates an unmodified hypothesis graph 200A. Hypothesis graph 200A is unmodified as it has not been modified by an occupant. Hypothesis graph 200A includes potential item locations 230A with respective location likelihoods 232A. The hypothesis graph 200A also includes events 202-218 associated with a lost or missing item (here, "laptop") that are arranged in chronological order from left to right.

In some implementations, a computing system (e.g., security monitoring system 108 as shown in FIG. 1) creates hypothesis graph 200A in response to receiving a command or query (e.g., query 120 as shown in FIG. 1) from an occupant (e.g., first occupant 104 as shown in FIG. 1) to locate a lost or missing item. In these implementations, the system can first obtain live data, including live video feed from one or more cameras (including, for example, movable cameras and/or drone(s) having cameras), to determine if the item is in plain sight. If, based on the live data, the system cannot locate the item or cannot locate the item with at least a preset degree of confidence (e.g., confidence of at least 80%, 85%, or some other amount), the system can access and analyze historical data, including stored video feed data.

In some implementations, accessing and analyzing historical data includes processing stored video feed data in order to obtain metadata and searching through the obtained metadata for metadata related to the particular item sought. In other implementations, the stored video feed data has already been processed in order to obtain metadata, and accessing and analyzing the historical data includes accessing the obtained metadata and searching through it for metadata related to the particular item sought. Based on the analysis of the historical data, alone or in combination with the current video feed, the system can identify one or more events (e.g., events 202-218) associated with the sought item and determine one or more potential locations (e.g., potential item locations 230A).

In some implementations, a system (e.g., security monitoring system 108 as shown in FIG. 1) creates hypothesis graph 200A automatically for a particular item and continuously updates the hypothesis graph 200A when new information comes available (e.g., when it identifies an object that might be the item, when it identifies an object that is commonly seen with the item, when it identifies a person that is commonly seen with an item, when an object is moved from a location where the item is commonly located, when an object is placed in a location where the item is commonly located, etc.). In these implementations, the system can automatically create hypothesis graphs, such as hypothesis graph 200A, for items that the system determines are high-value (e.g., through an internet search of the item) or for items specified by an occupant. For all other items, the system might not create a hypothesis graph for the item until it receives a command or query from an occupant.

In response to receiving a command or query from an occupant to locate a lost or missing item, the system (e.g., security monitoring system 108 as shown in FIG. 1) can provide the occupant the hypothesis graph 200A. For example, the system can provide hypothesis graph 200A for display and, in some implementations, for editing to an occupant's device (e.g., device 106 as shown in FIG. 1). As another example, the system can display the hypothesis graph 200A on a system interface (e.g., a screen that is part of the system) and, in some implementations, permit editing through the system interface.

In some implementations, where an outcome has an extremely high probability (e.g., where there is an extremely high likelihood that the item is at a particular location), the system creates a hypothesis graph with only this outcome (and the events leading to this outcome) and/or would show the occupant only this outcome as a simplified version of the hypothesis graph. For example, if the system was able to determine with high confidence that the item is currently visible in the live video feed of one or more of its cameras, the system can provide the occupant a hypothesis graph with this single location and the events leadings to this location.

In some implementations, the hypothesis graph that is provided to an occupant (e.g., hypothesis graph 200A) is a simplified version of the hypothesis graph initially created by the system. In these implementations, the system can provide to the occupant the top N most likely item locations (e.g., potential item locations 230A where N is five) or the item locations that have a likelihood above a preset threshold (e.g., a likelihood of at least 8%) when there may be additional but less likely locations for the sought item. Similarly, in these implementations, the system can remove events associated with the sought item that do not have a likelihood above a preset threshold (e.g., a likelihood of at least 20%).

In some implementations, a hypothesis graph is created for a particular time period. This time period can dictate the historical data that the system accesses and analyzes in order to determine a location of the sought item. Alternatively or in addition, the time period can limit the events provided to an occupant to those that occurred within the time period. In this sense, the time period can be used by the system to simplify the hypothesis graph that is provided to the occupant. The time period can be preset (e.g., one hour, twelve hours, one day, two days, one week, one month, etc.). The time period can be altered or supplied by an occupant. The time period can be variable based on the historical data.

Where the time period is variable, there can be an initial time period that is extended based on the system's ability to identify the sought item. For example, if the time period is initially set to one day but an analysis of the historical data in the past day reveals no indication of the sought item, the system can extend the time period (e.g., to two days, to one week, or some other time) and search through the historical data going back to the extended time period. The system can extend the time period until the item is identified with a sufficient confidence. This confidence can be set to 100% or can be set to another percentage (e.g., 95%, 90%, 85%, or some other amount). In addition, the system can extend the time period at a constant, near-constant, or variable rate. For example, the time period may be initially set to 0 (e.g., indicating that an analysis is first performed on the current video feed) before being extended at a rate at which the system can analyze the video data.

In the example of FIG. 2A, Jane, an occupant of a house, has indicated to the system (e.g., security monitoring system 108 as shown in FIG. 1) at a time 20:54 that she is searching for her laptop. In order to build the hypothesis graph 200A, the system uses a number of data points extracted from the system's sensors, including from its cameras. The system can use both live data and historical data in creating hypothesis graph 200A. The system is using a time period of one hour.

In extracting the data points, the system (e.g., security monitoring system 108 as shown in FIG. 1) analyzes the live and/or historical data from the past hour for sightings of the laptop in the camera feed of its one or more cameras, sightings of the laptop's owner, inferred location of the laptop's owner, sightings of the owner with the laptop, sightings of other occupants or persons with the laptop, and sightings of other items that might correspond with the laptop (e.g., the system might learn that the appearance of the laptop often coincides with the appearance of another item, such as a laptop bag; the system might infer corresponding items from general knowledge and life patterns, for example it might learn that laptops and other small items are often carried in bags or that an occupant has multiple bags each of which is large enough to hold the laptop; or the system can learn of corresponding items directly from an occupant).

In extracting the data points, the system (e.g., security monitoring system 108 as shown in FIG. 1) can also analyze the live and/or historical data from the past hour for sightings of the owner or other persons interacting with the laptop, inferred locations other persons who may have or may have interacted with the laptop, locations where the laptop was last placed, locations where the laptop has been lost in the past, locations where the owner or other persons performed activities that might be associated with the laptop (e.g., packing a bag, typing on an unseen device, picking up or placing down something unseen, etc.), interactions between the laptop and the system (e.g., time(s) when the laptop connected to the Wi-Fi network, time(s) when the laptop connected to a speaker over Bluetooth, time(s) when someone logged into the security system through the laptop, etc.), interactions between the people in the house where the system is located and the system (e.g., doors opening and closing as determined by the system's magnetic door sensors which indicates people coming and going), and the layout of the house (e.g., how rooms of the building are interconnected, the locations of the system's cameras or other sensors, etc.).

In the extraction of data points, the system (e.g., security monitoring system 108 as shown in FIG. 1) uses an inference model with a machine-learning network, such as deep neural network. The inference model can provide a confidence that it recognizes an item, an owner or other person, an action, etc. For example, a deep neural network of the inference model can assign an 80% confidence that it recognizes the item in a given video feed. Through these inferences and through previous observations (e.g., in the past, the item was left in this room 70% of the time), the system identifies any events that might affect the current location of the item and assigns probabilities to these one or more events (e.g., events 202-218).

Based on the extracted data points, the system (e.g., security monitoring system 108 as shown in FIG. 1) identifies a number of events 202-2018 related to the laptop and the laptop's potential locations 230A with respective location likelihoods 232A. The potential item locations 230A include a first location 220, a second location 222, a third location 224, a fourth location 226, and a fifth location 228. This initial event leading to all of these locations is event 202. In some implementations, there are multiple, different initial events that each lead to one or more locations. In some implementations, the initial event, such as event 202, is associated with probability of occurrence.

The first location 220 is that the laptop is with an occupant John. The system (e.g., security monitoring system 108 as shown in FIG. 1) has determined that there is a 16% likelihood that the laptop is at the first location 220. The events leading up to the first location 220 include the first event 202, a second event 204, and a third event 206. The first event 202 is that there is a bag near that door that might contain the laptop. The first event 202 occurred on Jan. 2, 2002 at 19:54. The system determined that there is a probability of 32% that the second event 204 followed the first event 202. The second event 204 is that John took the laptop out of the bag near the door and sat on a couch in the house. The second event occurred on Jan. 2, 2019 at 20:02. The system determined that there is a probability of 50% that the third event 206 followed the second event 204. The third event 206 is that John left the room with the laptop. The third event 206 occurred on Jan. 2, 2019 at 20:45. Based on events 202-206, the system determines that the laptop might be at the first location 220. Based on the probabilities associated with events 202-206, the system determines that the likelihood that the laptop is at the first location 220 is 16%.

The second location 222 is that the laptop is near the couch. The system (e.g., security monitoring system 108 as shown in FIG. 1) has determined that there is a 16% likelihood that the laptop is at the second location 222. The events leading up to the second location 222 include the first event 202, the second event 204, and a fourth event 208. The system determined that there is a probability of 50% that the fourth event 208 followed the second event 204. The fourth event 208 is that John left the room without the laptop. The fourth event 208 occurred on Jan. 2, 2019 at 20:45. Based on events 202-204 and 208, the system determines that the laptop might be at the second location 222. Based on the probabilities associated with events 202-204 and 208, the system determines that the likelihood that the laptop is at the second location 222 is 16%.

The third location 224 is that the laptop is in the bag in the kitchen. The system (e.g., security monitoring system 108 as shown in FIG. 1) has determined that there is a 38% likelihood that the laptop is at the third location 224. The events leading up to the third location 224 include the first event 202, a fifth event 210, a sixth event 212, and a seventh event 214. The system determined that there is a probability of 64% that the fifth event 210 followed the first event 202. The fifth event 210 is that John did not actually take the laptop out of the bag near the door but instead took a magazine out of the bag and sat on the couch. The fifth event 210 occurred on Jan. 2, 2019 at 20:02. The system determined that there is a probability of 83% that the sixth event 212 followed the fifth event 210. The sixth event 212 is that Jane picked up the bag near the door and left the room. The sixth event 212 occurred on Jan. 2, 2019 at 20:15. The system determined that there is a probability of 71% that the seventh event 214 followed the sixth event 212. The seventh event 214 is that Jane entered the kitchen of the house with the bag. The seventh event 214 occurred on Jan. 2, 2019 at 20:16. Based on events 202, 210, 212, and 214, the system determines that the laptop might be at the third location 224. Based on the probabilities associated with events 202, 210, 212, and 214, the system determines that the likelihood that the laptop is at the third location 224 is 38%.

The fourth location 226 is that the laptop is in the bag in a hall. The system (e.g., security monitoring system 108 as shown in FIG. 1) has determined that there is a 15% likelihood that the laptop is at the fourth location 226. The events leading up to the fourth location 226 include the first event 202, the fifth event 210, the sixth event 212, and an eighth event 216. The system determined that there is a probability of 28% that the eighth event 216 followed the sixth event 212. The eighth event 216 is that Jane entered the kitchen without the bag. The eighth event 216 occurred on Jan. 2, 2019 at 20:16. Based on events 202, 210, 212, and 216, the system determines that the laptop might be at the fourth location 226. Based on the probabilities associated with events 202, 210, 212, and 216, the system determines that the likelihood that the laptop is at the fourth location 226 is 15%.

The fifth location 228 is that the laptop is still in the bag near the door. The system (e.g., security monitoring system 108 as shown in FIG. 1) has determined that there is a 9% likelihood that the laptop is at the fifth location 228. The events leading up to the fifth location 228 include the first event 202, a fifth event 210, and a ninth event 218. The system determined that there is a probability of 14% that the ninth event 218 followed the fifth event 210. The ninth event 218 is that Jane left the room without the bag. The ninth event 218 occurred on Jan. 2, 2019 at 20:15. Based on events 202, 210, and 218, the system determines that the laptop might be at the fifth location 228. Based on the probabilities associated with events 202, 210, and 218, the system determines that the likelihood that the laptop is at the fifth location 228 is 9%.

FIG. 2B is a diagram that illustrates a modified hypothesis graph 200B. Hypothesis graph 200B is modified version of hypothesis graph 200A that has been edited by an occupant. Hypothesis graph 200B includes potential item locations 230B with respective potential location likelihoods 232B. The hypothesis graph 200B also includes events 202-218 associated with the lost or missing item (here, "laptop") that are arranged in chronological order from left to right.

Here, Jane has been provided hypothesis graph 200A as shown in FIG. 2A. Hypothesis graph 200A can have been displayed on a graphical user interface (GUI) in the format shown or in a different format (e.g., panel format as shown in interfaces 126B-126D of FIG. 1).

Jane has started the editing process by selecting the second event 204. The selection of the second event 204 is indicated by the bold outline surrounding the graphical representation of the second event 204. When selected, each of the events and potential locations are provided a verify button (shown as a check mark) and a deny button (shown as an X mark). Here, a verify button 230 and a deny button 232 is provided for the second event 204. Prior to a selection of either the verify button 230 or the deny button 232, the verify button 230 and the deny button 232 can be the same size. In some implementations, a third button is also displayed which resets the selection of either the verify button 230 or the deny button 232 upon its selection.

Jane has selected the deny button 232 for the second event 204. By selecting the deny button 232, Jane reduces the probability of the second event 204 having occurred to 0% (c.f., if Jane had selected the verify button 230, the probability of the second event 204 occurring would be increased to 100% or near to 100%). That is, by selecting the deny button 232, Jane is indicating that the second event 204 did not occur, that John did not take the laptop out of the bag. In response to the selection, the deny button 232 is made larger with respect to the verify button 230 in order to provide a visual indication of the selection. Upon selection of the deny button 232, a cross 234 is placed in the upper-left corner of the graphical representation of the second event 204 in order to indicate the non-occurrence of the second event 204.

By selecting the deny button 232, the likelihood that the laptop will be found at the first location 220 or the second location 222 are both reduced to 0% as they both require that second event 204 took place. Similarly, the probabilities associated with third event 206 and the fourth event 208 are also reduced to 0%. In some implementations, a cross (e.g., cross 234) is placed on each of events 206 and 208 to indicate their non-occurrence. In some implementations, a cross is placed on locations 220 and 222 to indicate that the laptop is not at those locations. In some implementations, second event 204 and any events or potential locations stemming from the second event 204 are removed from the hypothesis graph 200B and/or are hidden from Jane (unless any events or potential locations stemming from second event 204 are also part of a separate series of events or result from a separate series of events).

By selecting the deny button 232, the probability that the fifth event 210 occurred is increased from 64% to 96%. Although there is a 4% probability that the fifth event 210 did not occur, the alternative event(s) following from the first event 202 can have a low enough probability so as to be ignored by the system (e.g., security monitoring system 108 as shown in FIG. 1) and/or not displayed to Jane. Alternatively, the 4% probability that the fifth event 210 did not occur can represent a margin of error due to unknown, but possible alternative events.

Jane has also selected the fifth location 228 which brings to view the verify button 240 and the deny button 242 for the fifth location 228. The selection of the fifth location 228 is indicated by the bold outline surrounding the graphical representation of the fifth location 228. Here, Jane selects the deny button 242 which results in reducing the likelihood of the laptop being at the fifth location 228 to 0% and a cross 244 being placed in the upper-left corner of the graphical representation of the fifth location 228. The cross 244 indicates that the laptop is not at the fifth location 228. As an example, Jane selects the deny button 242 after having checked the fifth location 228 and confirming that the laptop is not there.

By selecting the deny button 242, the probability associated with the ninth event 218 is reduced to 0% due to the laptop being at the fifth location 228 being the only possible outcome from the ninth event 218.

By selecting the deny button 232 and the deny button 242, the probabilities associated with events 212, 214, and 216 are increased. Similarly, by selecting the deny button 232 and the deny button 242, the likelihood that the laptop is at the third location 224 (i.e., the laptop is in the bag in the kitchen) is increased from 38% to 67% and the likelihood that the laptop is at the fourth location 226 (i.e., the laptop is in the bag in the hall) is increased from 15% to 26%.

By selecting the deny button 232 and the deny button 242, the potential location likelihoods 232B are updated for the potential item locations 230B. In some implementations, any potential locations of potential item locations 230B whose likelihood is reduced to 0% are removed from the hypothesis graph and/or are hidden from Jane along with their respective potential location likelihood of potential location likelihoods 232B.

The manual feedback given by Jane can influence not only the probabilities of the hypothesis graph 200B but can also be fed back to the system (e.g., security monitoring system 108 as shown in FIG. 1) to retrain the underlying inference model(s) which generated those probabilities. For example, if the system had assigned a high confidence that the item was visible in a particular video, and the user invalidates this inference, the system could retrain its machine-learning network used to recolonize the object in that imagery. In such scenarios, the system might prompt the occupant for additional details (e.g., asking what the misidentified item actually is) in order to improve the retraining of the machine-learning network.

In some implementations, the system (e.g., security monitoring system 108 as shown in FIG. 1) can ask an occupant to provide further details about the missing or lost item. These details can include a description of the item or one or more features of the item. These details can include an indication of where the occupant last saw the item or who last had the item. For example, if there are multiple laptops in the house or if Jane has multiple laptops, the system might ask Jane for a color of the laptop, to name the laptop (e.g., where the name might be associated with a stored appearance model for the laptop), for a size of the laptop, etc. Alternatively, in this example, the system can search for all laptops in the house and provide the results for all to Jane.

In some implementations, if the system (e.g., security monitoring system 108 as shown in FIG. 1) recognizes that an item is in the process of being misplaced (e.g., an occupant is placing a particular item in a particular location where it tends to get lost), the system can notify the occupant (e.g., through a mobile app on the occupant's device). Similarly, if the system recognizes that an occupant is about to leave the house (or has left the house as indicated by, for example, a door sensor) without an item that he or she usually takes with them, the system can notify the occupant.

In some implementations, instead of providing feedback through a GUI (e.g., a touch screen), an occupant can provide feedback verbally through a microphone on their own device (e.g., device 106 as shown in FIG. 1) or through a microphone of the system (e.g., security monitoring system 108 as shown in FIG. 1).

In some implementations, the system (e.g., security monitoring system 108 as shown in FIG. 1) can textually request feedback by sending an occupant a notification through a GUI. The notification can be in the form of a question (e.g., "Where did you last know you had the laptop?"). This request can be made through a GUI of the occupant's device (e.g., device 106 as shown in FIG. 1) or through a GUI of the system.

In some implementations, the system (e.g., security monitoring system 108 as shown in FIG. 1) can verbally request feedback by asking the occupant to answer a question (e.g., "Where did you last know you had the laptop?"). This request can be made through a speaker on the occupant's device (e.g., device 106 as shown in FIG. 1) or through a speaker of the system.

In some implementations, instead of presenting the events and locations associated with an item as a graph, the system (e.g., security monitoring system 108 as shown in FIG. 1) provides different user interface elements. For example, the system can present an image or a short clip for each event associated with the item and an image or a short clip for each potential location associated with the item. These images or clips might be arranged as a series of panels (e.g., as shown in interfaces 126B-126D in FIG. 1). Where an image is used, there may be a single image for each event showing the start of the event, the middle of the event, or after the event has occurred. Where an image is used, there may be two or more images for each event, including an image before the event occurred and after the event occurred. Where a clip is used, the clip may start at or near the start of the event and end at or near the end of the event.

In some implementations, where the system (e.g., security monitoring system 108 as shown in FIG. 1) presents an image or a short clip for each event and potential location associated with the item, the system arranges the images/clips in a matrix such that each row represents a single hypothesis. That is, in these implementations, each row includes one potential location of the item and the events leading up to the item getting to that location. As such, certain images/clips for particular events can be repeated in various rows.

In some implementations, where the system (e.g., security monitoring system 108 as shown in FIG. 1) presents an image or a short clip for each event and potential location associated with the item, the system arranges the images/clips so that each row is designated for an occupant of the building. In these implementations, lines and/or arrows can be drawn between the rows and columns so as to depict the movement of items from image/clip to image/clip.

In some implementations, where the system (e.g., security monitoring system 108 as shown in FIG. 1) presents an image or a short clip for each event and potential location associated with the item, the system arranges the images/clips so that each row is designated for a particular room (or other area of a building) or a particular camera. In these implementations, lines and/or arrows can be drawn between the rows and columns so as to depict the movement of items and occupants from image/clip to image/clip.

In some implementations, instead of the hypothesis graph or in addition to the hypothesis graph, the system (e.g., security monitoring system 108 as shown in FIG. 1) provides the occupant a floor plan of the building in which the system is located. The floor plan can be overlaid with the potential current locations of items, the potential current locations of occupants, the locations of events, and lines/arrows connecting the events to the items and/or the occupants.

In some implementations, instead of the hypothesis graph or in addition to the hypothesis graph, the system (e.g., security monitoring system 108 as shown in FIG. 1) provides the occupant a list of the N most likely locations where the item might be found.

Figure 3:
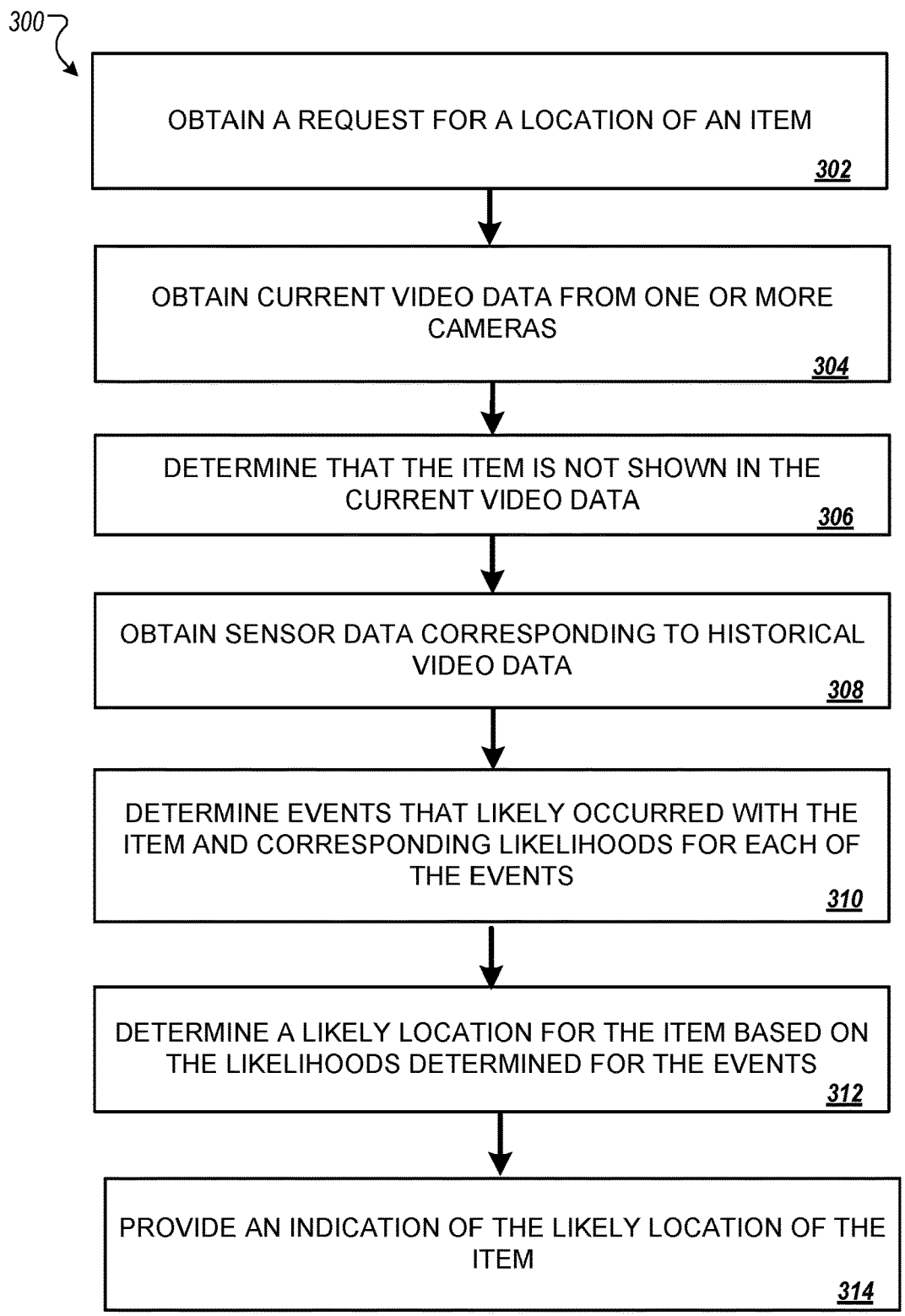
FIG. 3 is a flowchart of an example process for finding a lost or misplaced item.

FIG. 3 is an example process 300 for finding a lost or misplaced item. The process 300 can be performed, at least in part, using the security monitoring system 108 described herein or the security monitoring system 600 shown in FIG. 6.

The process 300 includes obtaining a request for a location of an item (302). For example, the security monitoring system 108 can receive query or command by an occupant (e.g., query 120 as shown in FIG. 1) through the mobile computing device 106 or through an interface of the security monitoring system 108.

The process 300 includes obtaining current video data from one or more cameras (304). Current video data can include live video data from cameras. For example, with respect to FIG. 1, in response to receiving the request to locate a laptop, the security monitoring system 108 can access current video from the cameras 110.

The process 300 includes determining that the item is not shown in the current video data (306). For example, with respect to FIG. 1, the security monitoring system 108 can determine that the laptop 124 is not visible in the current video data.

In some implementations, the security monitoring system 108 makes this determination by analyzing the current video data. In analyzing the current video data, the security monitoring system 108 can use an inference model having a machine-learning network. By using the inference model the security monitoring system 108 can determine a confidence of whether the item is in the current video data. The inference model can be used to compare the current video data (or current video data that has been processed by the security monitoring system 108) with one or more appearance models for the item, e.g., an appearance model of a laptop. This output of the model can be a confidence represented as a percentage. When the confidence is 100%, the security monitoring system 108 is sure that the item is in the current video data. When the confidence is 0%, the security monitoring system 108 is sure that the item is not in the current video data. In some implementations, the security monitoring system 108 determines that the item is not shown in the current video if the determined confidence is below a certain threshold (e.g., below 5%, 15%, 40%, or some other percentage).

In some implementations, determining that the item is not shown in the current video data and/or determining a confidence of whether the item is in the current video data includes obtaining an appearance model of the item, identifying objects within the current video data, and comparing the identified objects with an appearance model of the item. For example, with respect to FIG. 1, the security monitoring system 108 can look up a general appearance model for a laptop or a specific (e.g., stored) appearance model for the laptop 124 based on the query 120. The security monitoring system 108 can analyze the current video data to identify, for example, the bag 114 and the couch 116. The security monitoring system 108 can compare the laptop appearance model with the video data corresponding to the bag 114 and the couch 116 to determine that the laptop 124 is not shown in the current video data.

In some implementations, the security monitoring system 108 can also look up a general appearance model for a laptop bag or a specific (e.g., stored) appearance model for the bag 114 (laptop bag) based on the query 120 and having learned that the laptop 124 is commonly placed inside the bag 114 or is otherwise associated with the bag 114. The security monitoring system 108 can compare the laptop bag appearance model with the video data corresponding to the bag 114 and the couch 116 to determine that the laptop bag appearance model matches (or is similar to) the bag 114. The security monitoring system 108 can use the outcome of the comparison in determining a confidence of whether the laptop 124 is in the bag 114.

In some implementations, determining that the item is not shown in the current video data includes obtaining a confidence threshold (e.g., 40%); analyzing the current video data; based on the analysis, determining a confidence of whether the item is in the current video data; and determining that the current confidence is below the confidence threshold. Determining a confidence may include providing the analyzed video data to an inference model leveraging a machine-learning network. For example, the security monitoring system 108 can determine a confidence threshold using machine learning techniques after a training period. The confidence threshold used may be determined to be the most effective threshold for identifying items, e.g., the threshold that produces the most accurate results, the threshold that produces the most accurate results given processing constraints, the threshold that produces the most accurate results given time constraints, etc. The confidence threshold determined by the security monitoring system 108 can be, for example, 30%. After analyzing current video data obtained from the cameras 110A-110D, the security monitoring system 108 can determine that there is only a 5% confidence of the laptop 124 being shown in the current video data. Because the 5% confidence is less than the 30% confidence threshold, the security monitoring system 108 can determine that the laptop 124 is not readily apparent in the current video data.

The process 300 includes obtaining sensor data corresponding to historical video data (308). For example, with respect to FIG. 1, the security monitoring system 108 can access stored video feed data.

In some implementations, the historical video data is limited to video data taken/stored within a time period (e.g., the last week, the last month, the last year, etc.). This time period may be preset, may be selected or modified by an occupant, or may be variable as discussed above with respect to FIG. 2A.

In some implementations, the historical video data is not yet processed.

In other implementations, the historical video data has already been processed in order to obtain metadata. In these implementations, obtaining sensor data corresponding to historical video data includes obtaining metadata. In some implementations, sensor data includes stored video data. In some implementations, sensor data includes metadata extracted from the historical video data. The metadata can include, for example, a time when the video data was taken and/or stored, indications of one or more persons identified in the video data, indications of one or more items identified in the video data, etc.

In some implementations, obtaining sensor data includes obtaining a time-period and accessing historical video data that was created (e.g., taken and/or stored) within the obtained time-period. For example, the time-period can be the last hour, the last twelve hours, the last day, the last week, etc. With respect to FIG. 1, the security monitoring system 108 can have settings to only review video data taken or stored within the time period. The time period can be the last hour. Accordingly, when the security monitoring system 108 is attempting to locate the laptop 124, the security monitoring system 108 will only access historical video data that was taken or stored within the last hour to analyze.

In some implementations, if the security monitoring system 108 cannot locate the item in the historical video data for the given time period, the security monitoring system 108 can access or request older video data. For example, the security monitoring system 108 can request archived video data that might be stored on a remote database.

The process 300 includes determining events that likely occurred with the item and corresponding likelihood for each of the events (310). For example, with respect to FIG. 1, the security monitoring system 108 can determine that there is a 32% likelihood that a second occupant removed the laptop 124 from a bag, and a 50% likelihood, following from that event, that the second occupant left the room with the laptop 124. In some implementations, determining events that likely occurred with the item and corresponding likelihood for each of the events includes processing the obtained sensor data corresponding to historical video data to obtain metadata, accessing the obtained metadata, and searching through the obtained metadata for metadata related to the item. In other implementations, determining events that likely occurred with the item and corresponding likelihood for each of the events includes accessing the obtained metadata and searching through it for metadata related to the item.

In some implementations, determining events that likely occurred with the item and corresponding likelihood for each of the events includes extracting data points. In extracting data points, the security monitoring system 108 can use one or more inference models with one or more machine-learning networks (e.g., a deep neural network). The inference model(s) can provide a confidence that it recognizes an item, an owner or other person, an action by an owner or other person, etc. Based on the extracted data points, the security monitoring system 108 can identify the item, an owner of the item, a person other than the owner, an action of the owner, and/or an action of a person other than an owner. For example, based on the extracted data points, the security monitoring system 108 can identify the laptop 124.

The security monitoring system 108 can also determine a likelihood that the one or more identifications are correct, e.g., that the identified item is in fact the item, owner of the item is in fact the owner of the item, person other than the owner is in fact the person other than the owner, action of the owner is in fact the action of the owner, or action of a person other than the owner is in fact the action of the person other than the owner. For example, based on comparing the video data corresponding to the potential item with an appearance model of the item, the security monitoring system 108 can determine that there is a 95% confidence that the item 124' is the laptop 124. This confidence can be the output of one or more inference models. Through these inferences and through previous observations, the security monitoring system 108 identifies any events that might affect the current location of the item and assigns probabilities to these one or more events (e.g., events 202-218 as shown in FIGS. 2A-2B).

In some implementations, determining events that likely occurred with the item and corresponding likelihoods for each of the events includes extracting data points from the obtained sensor data; based on the extracted data points, identifying a pattern associated with the item; based on the identified pattern, determining events that likely occurred with the item; and based on the identified patterned, determining likelihoods for each of the determined events. For example, with respect to FIGS. 1-2A, the security monitoring system 108 can extract data points from the video data, including stored video data, captured by the cameras 110A-110D. The security monitoring system 108 can use the extracted data points identify one or more patterns associated with the laptop 124. For example, having learned from video data taken over the past month, the security monitoring system 108 can determine that the laptop 124 is usually not in the house 102 on weekdays between 9:00 AM and 4:00 PM, is usually placed in the bag 114 between 8:30 AM and 9:00 AM on weekdays, is usually taken out of the bag 114 between 4:00 PM and 5:00 PM on weekdays, is often left in the bag 114, is usually taken upstairs after 8:00 PM, etc. Based on, for example, the current time being 9:00 PM, the security monitoring system 108 can determine that there is a high likelihood (e.g., greater than 30% likelihood, greater than 50% likelihood, greater than 70% likelihood, etc.) that the laptop 124 was taken upstairs and/or is located upstairs.

In some implementations, determining events that likely occurred with the item and corresponding likelihoods for each of the events includes obtaining a likelihood threshold (e.g., 5%, 10%, 20%, 30%, etc.); extracting data points from the obtained sensor data; based on the extracted data points, determining one or more possible events that may have occurred with the item; determining a likelihood for each of the one or more possible events; comparing the one or more likelihoods for each of the one or more possible events with the likelihood threshold; and selecting one or more events of the one or more possible events that have a likelihood at or above the likelihood threshold. Determining a likelihood may include providing the extracted data points to an inference model leveraging a machine-learning network.

For example, with respect to FIGS. 1-2A, the security monitoring system 108 can extract data points from the video data, including stored video data, captured by the cameras 110A-110D. The security monitoring system 108 can use the extracted data points to determine the events 202-218 that may have occurred with the laptop 124 and to determine a likelihood of each of the events occurring. For example, the security monitoring system 108 can use the data points in determining a likelihood of 64% that John took a magazine of the bag 114 and sat on the couch 116. The security monitoring system 108 can use, for example, a likelihood threshold of 10% (e.g., based on input from the occupant 104, based on machine learning indicating that the selected likelihood threshold was the most effective, etc.). The security monitoring system 108 can compare the likelihood threshold of 10% to each of the events to eliminate events that do not meet the threshold. Here, the security monitoring system 108 would determine that the event 218 does not meet the likelihood threshold and, as a result, determine that the event 218 is not a likely event. In response, the security monitoring system 108 can also remove the potential location 228 from the potential locations 230A or determine that the potential location 228 is not a likely location.

In some implementations, the security monitoring system 108 can apply the likelihood threshold based on how likely an event follows another event (e.g., the potential likelihood of an event), instead of on the overall/current likelihood of the event occurring. For example, the security monitoring system 108 can use, for example, a likelihood threshold of 30% to determine that the events 218 and 216 are not likely events. However, the security monitoring system 108 can determine that the events 206 and 208 are likely events despite each of them having an overall likelihood of only 16% due to them each having a potential likelihood of 50% if the event 204 is later verified as having occurred.

In some implementations, determining a likelihood includes providing the extracted data points to an inference model leveraging a machine-learning network. For example, with respect to FIGS. 1-2A, the security monitoring system 108 can extract data points from the video data, including stored video data, captured by the cameras 110A-110D. The security monitoring system 108 can provide the extracted data points to one or more inference models. The inference models can, for example, be used to identify items from the extracted data points, generate appearance models for items appearing in the video data, identify patterns associated with various items using the extracted data points, etc.

The process 300 includes determining a likely location for the item based on the likelihood determined for the events (312). For example, with respect to FIGS. 1-2A, based on the 32% likelihood that the second occupant took the laptop 124 out of the bag and the 50% likelihood that they left the room with the laptop 124, the security monitoring system 108 can determine that there is a 16% likelihood that the second occupant still has the laptop 124 with them in a different room. In determining one or more likely locations for the item (e.g., the laptop 124), the security monitoring system 108 can determine likelihoods of the item being present at one or more potential locations.

In some implementations, one or more series of events leads to a single potential location (see FIGS. 2A-2B). The likelihood that the item is at the potential location is equal to (or near) the overall probability of the most recent event in the series of events leading to the item arriving at the potential location.

In some implementations, one or more series of events leads to multiple potential locations. The two or more potential locations for a particular series of events are analyzed by the system using its inference model(s). The inference model(s) may assign a confidence to each of the two or more potential locations. Using this confidence, previous observations, and the determined likelihoods for the events leading up to these two or more potential locations, the security monitoring system 108 determines a likelihood for each of the two or more potential locations. In order to save processing time, the security monitoring system 108 can ignore a series of events (and the one or more potential locations it leads to) if an event in the series of events has too low of a likelihood as this will likely indicate that the potential location that this series of events leads to is too low of likelihood to be relevant (unless one or more other series of events also leads to the same potential location). The security monitoring system 108 can ignore potential locations that it determines have too low of likelihood. Similarly, the security monitoring system 108 can deem a potential location a likely location only if the likelihood that the item is at that potential location meets a threshold percentage, e.g., is above a particular threshold percentage.

In some implementations, determining a likely location includes obtaining a location likelihood threshold (e.g., 10%); based on the determined events that likely occurred, determining one or more possible locations for the item; based on the likelihoods determined for the events, assigning a likelihood for each of the one or more possible locations; comparing the likelihoods for each of the one or more possible locations with the location likelihood threshold; and selecting a possible location with an assigned likelihood greater than or equal to the location likelihood threshold.

For example, with respect to FIGS. 1 and 2A, the security monitoring system 108 can determine that the location likelihood threshold should be 20% (e.g., based on input from the occupant 104, based on machine learning indicating that this likelihood threshold is the most effective, etc.) indicating that only potential locations having a potential location likelihood of 20% or higher will be selected (e.g., for further consideration, for presentation to the occupant 104, etc.). The security monitoring system 108 can uses the likelihood of 20% to eliminate the potential locations 220, 222, 226, and 228 from selection based on the potential location likelihoods 232A. Accordingly, the security monitoring system 108 would only select the potential location 224 due to it being the only one of the potential locations 230A having a potential location likelihood that met the likelihood threshold of 20%. The security monitoring system 108 can proceed to present an indication of the potential location 224 to the occupant 104. Based on the comparison of the potential locations 230A and potential location likelihoods 232A with the likelihood threshold of 20%, the security monitoring system 108 can determine that the potential location 224 is the only likely location of the laptop 124.

The process 300 includes providing an indication of the likely location of the item (314). For example, with respect to FIG. 1, the security monitoring system 108 can send an image or a clip of the second occupant leaving the room with the laptop 124 to the mobile computing device 106 of the occupant 104. This indication can be a textual description. For example, the textual description can be one of the potential locations 230A as shown in FIG. 2A with or without a respective location likelihood of the location likelihoods 232A. This indication can be an image or a clip of an area containing the likely location or an image or a clip of an area within the likely location. This indication can be an image or a clip of the item near the likely location or an area near the likely location (e.g., as depicted in interface 126D as shown in FIG. 1). This indication can be an image of the item (or an outline of the item) overlaid on a floor plan of the building in which the item is located.

Figure 4:
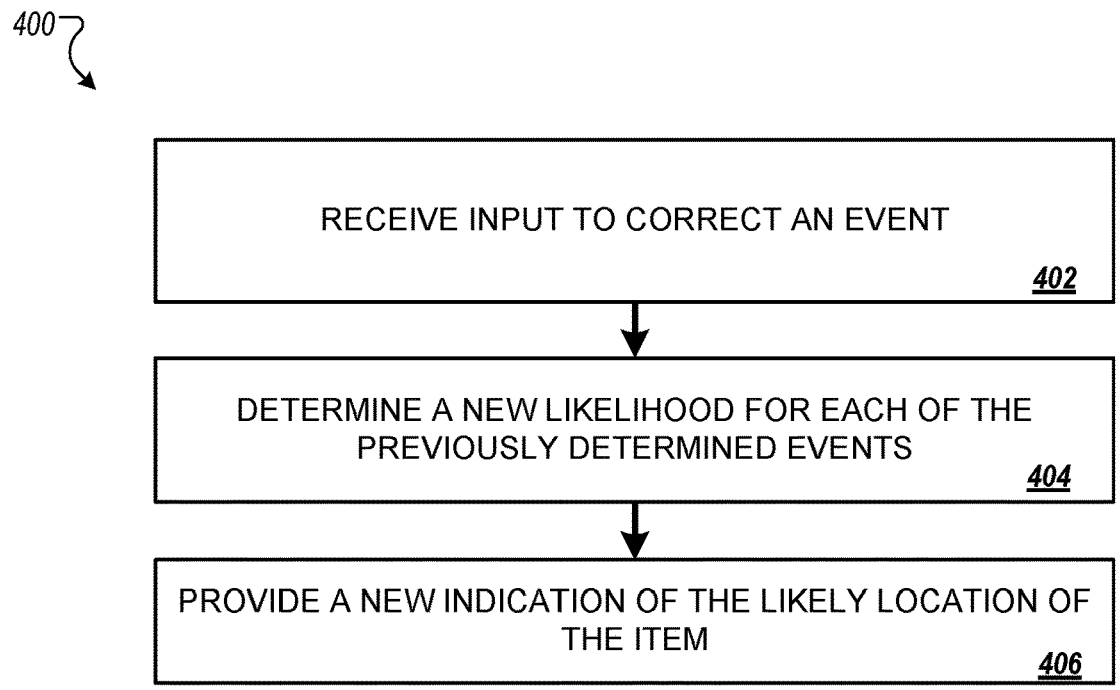
FIG. 4 is a flowchart of an example process for updating a hypothesis graph.

FIG. 4 is an example process 400 for updating a hypothesis graph. The process 400 can be performed, at least in part, using the security monitoring system 108 described herein or the security monitoring system 600 shown in FIG. 6. In some implementations, the process 400 follows the process 300 as described above with reference to FIG. 3.

The process 400 includes receiving input to correct an event (402). For example, with respect to FIGS. 1-2B, a user of the security monitoring system 108 can select the event 204 (e.g., by clicking on a representation of the event through an interface of the mobile computing device 106 or an interface of the security monitoring system 108) that a second occupant took a laptop out of a bag and deny that the event 204 occurred by a selecting an interface element having an X-mark (e.g., the button 232). As a result of the user denying the event 204, the security monitoring system 108 determines that the likelihood of the event 204 having occurred is 0%, that the likelihoods of any subsequent events that rely on the event 204 occurring (e.g., the events 206 and 208) are 0% (unless the events also relied on other, still valid/possible events), that the likelihoods of potentials locations that rely on the event 204 occurring (e.g., the potential locations 220 and 222) are 0% (unless the potential locations also relied on other, still valid/possible events). The input can be provided by a user of the security monitoring system 108, such as the occupant 104. For example, the input can be provided through an interface of the mobile computing device 106 or an interface of the security monitoring system 108. A user can correct an event by denying its occurrence or verifying its occurrence, e.g., through one of the interfaces.

In some implementations, receiving input to correct an event includes receiving an indication of a selection of the event, and receiving an instruction to either verify the event or deny the event. For example, with respect to FIGS. 1-2B, a user of the security monitoring system 108 can select an event 204 (e.g., by clicking on a representation of the event through an interface of the mobile computing device 106 or an interface of the security monitoring system 108) that a second occupant took a laptop out of a bag and verify that the event 204 occurred by selecting an interface element having an checkmark (e.g., the button 230). As a result of the user verifying the event 204, the security monitoring system 108 determines that the likelihood of the event 204 having occurred is 100%, that the likelihood of the event 210 occurring is 0%, that the likelihoods of any subsequent events that rely on the event 210 occurring (e.g., the events 212-218) are 0% (unless the events also relied on other, still valid/possible events), that the likelihoods of potentials locations that rely on the event 210 occurring (e.g., the potential locations 224-228) are 0% (unless the potential locations also relied on other, still valid/possible events).

The process 400 includes determining a new likelihood for each of the previously determined events (404). For example, because the system user has indicated that the one event did not occur, the likelihood that the second occupant took the laptop out of the bag is reduced to 0% as well as all the likelihoods of the events and locations directly stemming from that event. In this example, the likelihood of other events that do not directly stem from this event, such as the occupant taking a magazine out of the bag instead of the laptop, are increased. The security monitoring system 108 can determine a new likelihood for each of the previously events based on a user's correction to one or more of the events (e.g., a user verifying or denying an event). When an event's occurrence is denied, its previously determined likelihood is decreased to 0%. In some implementations, when an event's occurrence is denied, its previously determined likelihood is decreased to a percentage near 0% (e.g., 2%). In these implementations, the likelihood is not decreased all the way to 0% to account for mistakes by the user. When an event's occurrence is verified, its previously determined likelihood is increased to 100%. In some implementations, when an event's occurrence is verified, its previously determined likelihood is increased to a percentage near 100% (e.g., 98%). In these implementations, the likelihood is not increased all the way to 100% to account for mistakes by the user.

When an event's occurrence is denied, the likelihood of events stemming from that event are also reduced to 0% or near 0% (unless such an event is also part of another series of events). Similarly, when an event's occurrence is denied, the likelihood of any potential locations resulting from the series of events that the event is part of are also reduced to 0% or near 0% (unless such a potential location also results from another series of events). When an event's occurrence is denied, the security monitoring system 108 updates the likelihoods for the remaining events and potential locations. When an event's occurrence is denied, this will usually result in an increased likelihood for the remaining events and potential locations.

When an event's occurrence is verified, the likelihood of events stemming from that event are also increased. Similarly, when an event's occurrence is verified, the likelihood of any potential locations resulting from the series of events that the event is part of are also increased. When an event's occurrence is verified, the security monitoring system 108 updates the likelihoods of any events or potential locations that are outside the series of events that the event is part of. This will result in the likelihood of those outside events and/or potential locations being reduced to 0% or near 0%.

The process 400 includes providing a new indication of the likely location of the item (406). For example, the system may send a new image or a clip of the bag in the kitchen and an image or a clip of the bag in the hall, as these are the remaining possible locations of the laptop. This indication may be an updated textual description (e.g., potential locations 230B as shown in FIG. 2B with or without respective potential location likelihoods 232B). This indication may be an updated image or a clip of an area containing the likely location or an image or a clip of an area within the likely location. This indication may be an updated image or a clip of the item near the likely location or an area near the likely location (e.g., as depicted in interface 126D as shown in FIG. 1). This indication may be an updated image of the item (or an updated outline of the item) overlaid on a floor plan of the building in which the item is located.

FIG. 5 is an example process 500 for determining multiple likely locations of an item. The process 500 can be performed, at least in part, using the security monitoring system 108 described herein or the security monitoring system 600 shown in FIG. 6. In some implementations, the process 500 follows the process 300 as described above with reference to FIG. 3.

The process 500 includes determining one or more additional likely locations of the item based on the likelihoods determined for the events (502). For example, with respect to FIG. 1, the security monitoring system 108 can determine that in addition to the second occupant 122 possibly having the laptop 124, there are four other likely locations (e.g., locations having likelihood above 5%). The security monitoring system 108 can determine the one or more additional likely locations in a manner similar to that described above with respect to FIG. 3.

In some implementations, determining a likely location for an item and determining one or more additional likely locations includes obtaining a location count threshold (e.g., five locations); based on the determined events that likely occurred, determining possible locations for the item; and based on the likelihoods determined for the events, selecting from the possible locations the most likely locations, where the number of locations selected is equal to or less than the location count threshold. For example, with respect to FIGS. 1 and 2A, if the security monitoring system 108 determines that the location count threshold should be four locations (e.g., based on input from the occupant 104, based on machine learning indicating that this count threshold is the most effective, etc.), the security monitoring system 108 can select the potential locations 220-226 as the most likely location and remove the location 228 based on the potential location likelihoods 232A.

In some implementations, the process 500 includes providing one or more indications of each of the one or more additional likely locations of the item (504). For example, with respect to FIGS. 1-2A, the security monitoring system 108 can present the potential locations 230A and, optionally, the potential locations likelihoods 232A on an interface of the mobile computing device 106 of the occupant 104. Similarly, the security monitoring system 108 can present the potential locations 230A and, optionally, the potential locations likelihoods 232A on an interface of the security monitoring system 108 (e.g., an interface of a security panel). Presenting the potential locations 230A can include, for example, the security monitoring system 108 presenting an image of each of the potential locations 230A and/or presenting a textual description of each of the potential locations 230A on the interface of the mobile computing device 106 and/or an interface of the security monitoring system 108.

FIG. 6 is a block diagram of an example security monitoring system 600. The system 600 includes a network 605, a control unit 610, one or more user devices 640 and 650, a monitoring server 660, and a central alarm station server 670. In some examples, the network 605 facilitates communications between the control unit 610, the one or more user devices 640 and 650, the monitoring server 660, and the central alarm station server 670.

In some implementations, the system 600 is the security monitoring system 108 as shown in FIG. 1.

The network 605 is configured to enable exchange of electronic communications between devices connected to the network 605. For example, the network 605 may be configured to enable exchange of electronic communications between the control unit 610, the one or more user devices 640 and 650, the monitoring server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 may include a processor or other control circuitry configured to execute instructions of a program that controls operation of a control unit system. In these examples, the controller 612 may be configured to receive input from sensors, flow meters, or other devices included in the control unit system and control operations of devices included in the household (e.g., speakers, lights, doors, etc.). For example, the controller 612 may be configured to control operation of the network module 614 included in the control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the control unit 610 to communicate over a local area network and/or the Internet. The network module 614 also may be a voice band modem configured to enable the alarm panel to communicate over the telephone lines of Plain Old Telephone Systems (POTS).

The control unit system that includes the control unit 610 includes one or more sensors. For example, the monitoring system may include multiple sensors 620. The sensors 620 may include a lock sensor, a contact sensor, a motion sensor, or any other type of sensor included in a control unit system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 620 may include a radio-frequency identification (RFID) sensor that identifies a particular article that includes a pre-assigned RFID tag.

The control unit 610 communicates with the module 622 and the camera 630 to perform monitoring. The module 622 is connected to one or more devices that enable home automation control. For instance, the module 622 may be connected to one or more lighting systems and may be configured to control operation of the one or more lighting systems. Also, the module 622 may be connected to one or more electronic locks at the property and may be configured to control operation of the one or more electronic locks (e.g., control Z-Wave locks using wireless communications in the Z-Wave protocol. Further, the module 622 may be connected to one or more appliances at the property and may be configured to control operation of the one or more appliances. The module 622 may include multiple modules that are each specific to the type of device being controlled in an automated manner. The module 622 may control the one or more devices based on commands received from the control unit 610. For instance, the module 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building or within a residential facility 102-A monitored by the control unit 610. The camera 630 may be configured to capture single, static images of the area and also video images of the area in which multiple images of the area are captured at a relatively high frequency (e.g., thirty images per second). The camera 630 may be controlled based on commands received from the control unit 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the module 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the control unit 610. The camera 630 may employ a small solar cell to recharge the battery when light is available. Alternatively, the camera 630 may be powered by the controller's 612 power supply if the camera 630 is colocated with the controller 612.

In some implementations, the camera 630 communicates directly with the monitoring server 660 over the Internet. In these implementations, image data captured by the camera 630 does not pass through the control unit 610 and the camera 630 receives commands related to operation from the monitoring server 660.

The system 600 also includes thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634.

A module 637 is connected to one or more components of an HVAC system associated with a property, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 through a communication link 636 and can control the one or more components of the HVAC system based on commands received from the thermostat 634.

In some examples, the system 600 further includes one or more robotic devices 690. The robotic devices 690 may be any type of robots that are capable of moving and taking actions that assist in security monitoring. For example, the robotic devices 690 may include the motorized furniture (as described above with respect to FIGS. 1A-3) or drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 690 may be robotic devices 690 that are intended for other purposes and merely associated with the system 600 for use in appropriate circumstances. For instance, a robotic vacuum cleaner device may be associated with the monitoring system 600 as one of the robotic devices 690 and may be controlled to take action responsive to monitoring system events.

In some examples, the robotic devices 690 automatically navigate within a property. In these examples, the robotic devices 690 include sensors and control processors that guide movement of the robotic devices 690 within the property. For instance, the robotic devices 690 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 690 may include control processors that process output from the various sensors and control the robotic devices 690 to move along a path that reaches the desired destination and avoids obstacles. In this regard, the control processors detect walls or other obstacles in the property and guide movement of the robotic devices 690 in a manner that avoids the walls and other obstacles.

In addition, the robotic devices 690 may store data that describes attributes of the property. For instance, the robotic devices 690 may store a floorplan and/or a three-dimensional model of the property that enables the robotic devices 690 to navigate the property. During initial configuration, the robotic devices 690 may receive the data describing attributes of the property, determine a frame of reference to the data (e.g., a home or reference location in the property), and navigate the property based on the frame of reference and the data describing attributes of the property. Further, initial configuration of the robotic devices 690 also may include learning of one or more navigation patterns in which a user provides input to control the robotic devices 690 to perform a specific navigation action (e.g., fly to an upstairs bedroom and spin around while capturing video and then return to a home charging base). In this regard, the robotic devices 690 may learn and store the navigation patterns such that the robotic devices 690 may automatically repeat the specific navigation actions upon a later request.

In some examples, the robotic devices 690 may include data capture and recording devices. In these examples, the robotic devices 690 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 690 to take and store a biometric sample that can be used to identify the person (e.g., a biometric sample with DNA that can be used for DNA testing).

In some implementations, the robotic devices 690 may include output devices. In these implementations, the robotic devices 690 may include one or more displays, one or more speakers, and/or any type of output devices that allow the robotic devices 690 to communicate information to a nearby user.

The robotic devices 690 also may include a communication module that enables the robotic devices 690 to communicate with the control unit 610, each other, and/or other devices. The communication module may be a wireless communication module that allows the robotic devices 690 to communicate wirelessly. For instance, the communication module may be a Wi-Fi module that enables the robotic devices 690 to communicate over a local wireless network at the property. The communication module further may be a 900 MHz wireless communication module that enables the robotic devices 690 to communicate directly with the control unit 610. Other types of short-range wireless communication protocols, such as Bluetooth, Bluetooth LE, Z-wave, Zig-Bee, etc., may be used to allow the robotic devices 690 to communicate with other devices in the property.

The robotic devices 690 further may include processor and storage capabilities. The robotic devices 690 may include any suitable processing devices that enable the robotic devices 690 to operate applications and perform the actions described throughout this disclosure. In addition, the robotic devices 690 may include solid state electronic storage that enables the robotic devices 690 to store applications, configuration data, collected sensor data, and/or any other type of information available to the robotic devices 690.

The robotic devices 690 are associated with one or more charging stations. The charging stations may be located at predefined home base or reference locations in the property. The robotic devices 690 may be configured to navigate to the charging stations after completion of tasks needed to be performed for the monitoring system 600. For instance, after completion of a monitoring operation or upon instruction by the control unit 610, the robotic devices 690 may be configured to automatically fly to and land on one of the charging stations. In this regard, the robotic devices 690 may automatically maintain a fully charged battery in a state in which the robotic devices 690 are ready for use by the monitoring system 600.

The charging stations may be contact based charging stations and/or wireless charging stations. For contact based charging stations, the robotic devices 690 may have readily accessible points of contact that the robotic devices 690 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 690 may charge through a wireless exchange of power. In these cases, the robotic devices 690 need only locate themselves closely enough to the wireless charging stations for the wireless exchange of power to occur. In this regard, the positioning needed to land at a predefined home base or reference location in the property may be less precise than with a contact based charging station. Based on the robotic devices 690 landing at a wireless charging station, the wireless charging station outputs a wireless signal that the robotic devices 690 receive and convert to a power signal that charges a battery maintained on the robotic devices 690.

In some implementations, each of the robotic devices 690 has a corresponding and assigned charging station such that the number of robotic devices 690 equals the number of charging stations. In these implementations, the robotic devices 690 always navigate to the specific charging station assigned to that robotic device. For instance, a first robotic device may always use a first charging station and a second robotic device may always use a second charging station.

In some examples, the robotic devices 690 may share charging stations. For instance, the robotic devices 690 may use one or more community charging stations that are capable of charging multiple robotic devices 690. The community charging station may be configured to charge multiple robotic devices 690 in parallel. The community charging station may be configured to charge multiple robotic devices 690 in serial such that the multiple robotic devices 690 take turns charging and, when fully charged, return to a predefined home base or reference location in the property that is not associated with a charger. The number of community charging stations may be less than the number of robotic devices 690.

Also, the charging stations may not be assigned to specific robotic devices 690 and may be capable of charging any of the robotic devices 690. In this regard, the robotic devices 690 may use any suitable, unoccupied charging station when not in use. For instance, when one of the robotic devices 690 has completed an operation or is in need of battery charge, the control unit 610 references a stored table of the occupancy status of each charging station and instructs the robotic device to navigate to the nearest charging station that is unoccupied.

The system 600 further includes one or more integrated security devices 680. The one or more integrated security devices may include any type of device used to provide alerts based on received sensor data. For instance, the one or more control units 610 may provide one or more alerts to the one or more integrated security input/output devices. Additionally, the one or more control units 610 may receive one or more sensor data from the sensors 620 and determine whether to provide an alert to the one or more integrated security input/output devices 680.

The sensors 620, the module 622, the camera 630, the thermostat 634, and the integrated security devices 680 communicate with the controller 612 over communication links 624, 626, 628, 632, 684, and 586. The communication links 624, 626, 628, 632, 684, and 586 may be a wired or wireless data pathway configured to transmit signals from the sensors 620, the module 622, the camera 630, the thermostat 634, and the integrated security devices 680 to the controller 612. The sensors 620, the module 622, the camera 630, the thermostat 634, and the integrated security devices 680 may continuously transmit sensed values to the controller 612, periodically transmit sensed values to the controller 612, or transmit sensed values to the controller 612 in response to a change in a sensed value.

The communication links 624, 626, 628, 632, 684, and 586 may include a local network. The sensors 620, the module 622, the camera 630, the thermostat 634, and the integrated security devices 680, and the controller 612 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 5 (CAT6) wired Ethernet network. The local network may be a mesh network constructed based on the devices connected to the mesh network.

The monitoring server 660 is an electronic device configured to provide monitoring services by exchanging electronic communications with the control unit 610, the one or more user devices 640 and 650, and the central alarm station server 670 over the network 605. For example, the monitoring server 660 may be configured to monitor events (e.g., alarm events) generated by the control unit 610. In this example, the monitoring server 660 may exchange electronic communications with the network module 614 included in the control unit 610 to receive information regarding events (e.g., alerts) detected by the control unit 610. The monitoring server 660 also may receive information regarding events (e.g., alerts) from the one or more user devices 640 and 650.

In some examples, the monitoring server 660 may route alert data received from the network module 614 or the one or more user devices 640 and 650 to the central alarm station server 670. For example, the monitoring server 660 may transmit the alert data to the central alarm station server 670 over the network 605.

The monitoring server 660 may store sensor and image data received from the monitoring system and perform analysis of sensor and image data received from the monitoring system. Based on the analysis, the monitoring server 660 may communicate with and control aspects of the control unit 610 or the one or more user devices 640 and 650.

The central alarm station server 670 is an electronic device configured to provide alarm monitoring service by exchanging communications with the control unit 610, the one or more mobile devices 640 and 650, and the monitoring server 660 over the network 605. For example, the central alarm station server 670 may be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more mobile devices 640 and 650 and/or the monitoring server 660.

The central alarm station server 670 is connected to multiple terminals 672 and 674. The terminals 672 and 674 may be used by operators to process alerting events. For example, the central alarm station server 670 may route alerting data to the terminals 672 and 674 to enable an operator to process the alerting data. The terminals 672 and 674 may include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a sensor 620 detected motion from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more user devices 640 and 650 are devices that host and display user interfaces. For instance, the user device 640 is a mobile device that hosts one or more native applications (e.g., the smart home application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a smart home application 642. The smart home application 642 refers to a software/firmware program running on the corresponding mobile device that enables the user interface and features described throughout. The user device 640 may load or install the smart home application 642 based on data received over a network or data received from local media. The smart home application 642 runs on mobile devices platforms, such as iPhone, iPod touch, Blackberry, Google Android, Windows Mobile, etc. The smart home application 642 enables the user device 640 to receive and process image and sensor data from the monitoring system.

The user device 650 may be a general-purpose computer (e.g., a desktop personal computer, a workstation, or a laptop computer) that is configured to communicate with the monitoring server 660 and/or the control unit 610 over the network 605. The user device 650 may be configured to display a smart home user interface 652 that is generated by the user device 650 or generated by the monitoring server 660. For example, the user device 650 may be configured to display a user interface (e.g., a web page) provided by the monitoring server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit 610 using the communication link 638. For instance, the one or more user devices 640 and 650 may communicate with the control unit 610 using various local wireless protocols such as Wi-Fi, Bluetooth, Z-wave, ZigBee, HomePlug (Ethernet over power line), or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring server 660) may be significantly slower.

Although the one or more user devices 640 and 650 are shown as communicating with the control unit 610, the one or more user devices 640 and 650 may communicate directly with the sensors and other devices controlled by the control unit 610. In some implementations, the one or more user devices 640 and 650 replace the control unit 610 and perform the functions of the control unit 610 for local monitoring and long range/offsite communication.

In other implementations, the one or more user devices 640 and 650 receive monitoring system data captured by the control unit 610 through the network 605. The one or more user devices 640, 650 may receive the data from the control unit 610 through the network 605 or the monitoring server 660 may relay data received from the control unit 610 to the one or more user devices 640 and 650 through the network 605. In this regard, the monitoring server 660 may facilitate communication between the one or more user devices 640 and 650 and the monitoring system.

In some implementations, the one or more user devices 640 and 650 may be configured to switch whether the one or more user devices 640 and 650 communicate with the control unit 610 directly (e.g., through link 638) or through the monitoring server 660 (e.g., through network 605) based on a location of the one or more user devices 640 and 650. For instance, when the one or more user devices 640 and 650 are located close to the control unit 610 and in range to communicate directly with the control unit 610, the one or more user devices 640 and 650 use direct communication. When the one or more user devices 640 and 650 are located far from the control unit 610 and not in range to communicate directly with the control unit 610, the one or more user devices 640 and 650 use communication through the monitoring server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 only includes the one or more user devices 640 and 650, the sensors 620, the module 622, the camera 630, and the robotic devices 690. The one or more user devices 640 and 650 receive data directly from the sensors 620, the module 622, the camera 630, and the robotic devices 690 and sends data directly to the sensors 620, the module 622, the camera 630, and the robotic devices 690. The one or more user devices 640, 650 provide the appropriate interfaces/processing to provide visual surveillance and reporting.

In other implementations, the system 600 further includes network 605 and the sensors 620, the module 622, the camera 630, the thermostat 634, and the robotic devices 690 are configured to communicate sensor and image data to the one or more user devices 640 and 650 over network 605 (e.g., the Internet, cellular network, etc.). In yet another implementation, the sensors 620, the module 622, the camera 630, the thermostat 634, and the robotic devices 690 (or a component, such as a bridge/router) are intelligent enough to change the communication pathway from a direct local pathway when the one or more user devices 640 and 650 are in close physical proximity to the sensors 620, the module 622, the camera 630, the thermostat 634, and the robotic devices 690 to a pathway over network 605 when the one or more user devices 640 and 650 are farther from the sensors 620, the module 622, the camera 630, the thermostat 634, and the robotic devices 690. In some examples, the system leverages GPS information from the one or more user devices 640 and 650 to determine whether the one or more user devices 640 and 650 are close enough to the sensors 620, the module 622, the camera 630, the thermostat 634, and the robotic devices 690 to use the direct local pathway or whether the one or more user devices 640 and 650 are far enough from the sensors 620, the module 622, the camera 630, the thermostat 634, and the robotic devices 690 that the pathway over network 605 is required. In other examples, the system leverages status communications (e.g., pinging) between the one or more user devices 640 and 650 and the sensors 620, the module 622, the camera 630, the thermostat 634, and the robotic devices 690 to determine whether communication using the direct local pathway is possible. If communication using the direct local pathway is possible, the one or more user devices 640 and 650 communicate with the sensors 620, the module 622, the camera 630, the thermostat 634, and the robotic devices 690 using the direct local pathway. If communication using the direct local pathway is not possible, the one or more user devices 640 and 650 communicate with the sensors 620, the module 622, the camera 630, the thermostat 634, and the robotic devices 690 using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 uses several techniques to reduce costs while providing access to significant levels of useful visual information.

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "Away" state, but set not to capture images when the alarm system is armed in a "Stay" state or disarmed. In addition, the camera 630 may be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
obtaining a request for a location of an item;
obtaining current video data from one or more cameras;
determining that the item is not shown in the current video data;
obtaining sensor data corresponding to historical video data;
determining events that likely occurred with the item and corresponding likelihoods for each of the events;
determining a likely location for the item based on the likelihoods determined for the events; and
providing an indication of the likely location of the item.

2. The method of claim 1, comprising:
determining one or more additional likely locations for the item based on the likelihoods determined for the events; and
providing one or more indications of each of the one or more additional likely locations of the item.

3. The method of claim 2, wherein determining a likely location for the item and determining one or more additional likely locations comprises:
obtaining a location count threshold;
based on the determined events that likely occurred, determining possible locations for the item; and
based on the likelihoods determined for the events, selecting from the possible locations the most likely locations, wherein a number of locations selected is equal to or less than the location count threshold.

4. The method of claim 1, wherein determining a likely location comprises:
obtaining a location likelihood threshold;
based on the determined events that likely occurred, determining one or more possible locations for the item;
based on the likelihoods determined for the events, assigning a likelihood for each of the one or more possible locations;
comparing the likelihoods for each of the one or more possible locations with the location likelihood threshold; and
selecting a possible location with an assigned likelihood greater than or equal to the location likelihood threshold.

5. The method of claim 1, wherein the sensor data comprises stored video data.

6. The method of claim 1, wherein the sensor data comprises metadata extracted from the historical video data.

7. The method of claim 1, wherein obtaining the sensor data comprises:
obtaining a time-period; and
accessing historical video data that was created within the obtained time-period.

8. The method of claim 1, wherein determining that the item is not shown in the current video data comprises:
obtaining an appearance model of the item;
identifying objects within the current video data; and
comparing the identified objects with the appearance model of the item.

9. The method of claim 1, wherein determining that the item is not shown in the current video data comprises:
obtaining a confidence threshold;
analyzing the current video data;
based on the analysis, determining a confidence of whether the item is in the current video data; and
determining that the confidence is below the confidence threshold.

10. The method of claim 9, wherein determining a confidence comprises providing the analyzed video data to an inference model leveraging a machine-learning network.

11. The method of claim 1, wherein determining events that likely occurred with the item and corresponding likelihoods for each of the events comprises:
extracting data points from the obtained sensor data;
based on the extracted data points, identifying at least one of the item, an owner of the item, a person other than the owner, an action of the owner, or an action of a person other than the owner; and
determining a likelihood that the one or more identifications are correct.

12. The method of claim 1, wherein determining events that likely occurred with the item and corresponding likelihoods for each of the events comprises:
extracting data points from the obtained sensor data;
based on the extracted data points, identifying a pattern associated with the item;

based on the identified pattern, determining events that likely occurred with the item; and based on the identified patterned, determining likelihoods for each of the determined events.

13. The method of claim 1, wherein determining events that likely occurred with the item and corresponding likelihoods for each of the events comprises:

obtaining a likelihood threshold;

extracting data points from the obtained sensor data;

based on the extracted data points, determining one or more possible events that may have occurred with the item;

determining a likelihood for each of the one or more possible events;

comparing the one or more likelihoods for each of the one or more possible events with the likelihood threshold; and selecting one or more events of the one or more possible events that have a likelihood at or above the likelihood threshold.

14. The method of claim 13, wherein determining a likelihood comprises providing the extracted data points to an inference model leveraging a machine-learning network.

15. The method of claim 1, wherein providing an indication of the likely location of the item comprises at least one of providing a textual description of the likely location, an image of the likely location, a clip of the likely location, or a floor plan having the likely location marked thereon.

16. The method of claim 1, comprising:

receiving input to correct an event of the events that likely occurred with the item;

determining a new likelihood for each of the previously determined events; and providing a new indication of the likely location of the item.

17. The method of claim 16, wherein receiving input to correct an event comprises:

receiving an indication of a selection of the event; and receiving an instruction to either verify the event or deny the event.

18. The method of claim 17, wherein determining a new likelihood for each of the previously determined events comprises increasing the likelihood of the event if the instruction is to verify the event or decreasing the likelihood of the event if the instruction is to deny the event.

19. A system comprising:

one or more sensors, including one or more cameras; and a computer having one or more processors, the computer configured to:

obtain a request for a location of an item;

obtain current video data from the one or more cameras;

determine that the item is not shown in the current video data;

obtain sensor data corresponding to historical video data;

determine events that likely occurred with the item and corresponding likelihoods for each of the events;

determine a likely location for the item based on the likelihoods determined for the events; and provide an indication of the likely location of the item.

20. One or more non-transitory computer-readable media storing a computer program, the program comprising instructions that when executed by one or more processing devices cause the one or more processing devices to perform operations comprising:

obtaining, by the one or more processing devices, a request for a location of an item;

obtaining, by the one or more processing devices, current video data from one or more cameras;

determining, by the one or more processing devices, that the item is not shown in the current video data;

obtaining, by the one or more processing devices, sensor data corresponding to historical video data;

determining, by the one or more processing devices, events that likely occurred with the item and corresponding likelihoods for each of the events;

determining, by the one or more processing devices, a likely location for the item based on the likelihoods determined for the events; and providing, by the one or more processing devices, an indication of the likely location of the item.

* * * * *